United States Patent [19]
Lokhandwala et al.

[11] Patent Number: 5,769,926
[45] Date of Patent: Jun. 23, 1998

[54] MEMBRANE SEPARATION OF ASSOCIATED GAS

[75] Inventors: Kaaeid A. Lokhandwala, Menlo Park; Richard W. Baker, Palo Alto, both of Calif.

[73] Assignee: Membrane Technology and Research, Inc., Menlo Park, Calif.

[21] Appl. No.: 789,371

[22] Filed: Jan. 24, 1997

[51] Int. Cl.[6] .................................................. B01D 53/22
[52] U.S. Cl. .................... 95/39; 95/45; 95/50; 95/247; 95/258; 95/259; 96/4; 96/193; 585/818
[58] Field of Search .............................. 95/39, 45, 47–55, 95/243, 247, 258, 259, 226; 96/4–14, 188, 193; 585/818, 819

[56] References Cited

U.S. PATENT DOCUMENTS

| | | | |
|---|---|---|---|
| 4,367,135 | 1/1983 | Posey, Jr. | 208/108 |
| 4,374,657 | 2/1983 | Schendel et al. | 95/50 X |
| 4,386,944 | 6/1983 | Kimura | 96/4 X |
| 4,466,946 | 8/1984 | Goddin, Jr. et al. | 426/228 |
| 4,548,619 | 10/1985 | Steacy | 55/16 |
| 4,617,030 | 10/1986 | Heath | 95/39 |
| 4,654,063 | 3/1987 | Auvil et al. | 96/4 X |
| 4,772,295 | 9/1988 | Kato et al. | 55/16 |
| 4,857,078 | 8/1989 | Watler | 55/16 |
| 4,936,887 | 6/1990 | Waldo et al. | 96/4 X |
| 4,994,094 | 2/1991 | Behling et al. | 95/50 X |
| 5,030,339 | 7/1991 | Czarnecki | 208/351 |
| 5,082,551 | 1/1992 | Reynolds | 208/100 |
| 5,089,033 | 2/1992 | Wijmans | 55/16 |
| 5,199,962 | 4/1993 | Wijmans | 55/16 |
| 5,205,843 | 4/1993 | Kaschemekat et al. | 55/16 |
| 5,224,350 | 7/1993 | Mehra | 62/17 |
| 5,256,295 | 10/1993 | Baker et al. | 95/45 X |
| 5,256,296 | 10/1993 | Baker et al. | 95/45 X |
| 5,273,572 | 12/1993 | Baker et al. | 95/48 |
| 5,281,255 | 1/1994 | Toy et al. | 95/50 |
| 5,306,331 | 4/1994 | Auvil et al. | 95/45 X |
| 5,326,385 | 7/1994 | Rajani et al | 95/50 X |
| 5,332,424 | 7/1994 | Rao et al. | 95/50 X |
| 5,374,300 | 12/1994 | Kaschemekat et al. | 95/39 |
| 5,501,722 | 3/1996 | Toy et al. | 95/50 |

OTHER PUBLICATIONS

R.W. Baker and M. Jacobs, "Improve Monomer Recover form Polyolefin Resin Degassing," Hydrocarbon Processing, Mar. 1996.

*Primary Examiner*—Robert Spitzer
*Attorney, Agent, or Firm*—J. Farrant

[57] ABSTRACT

An improved, membrane-based method of treating gas evolved during gas/oil separation, to separate the very light hydrocarbon gases, methane in particular, from the heavier hydrocarbons. The membrane acts as a demethanizer and establishes a vapor/liquid equilibrium during phase separation that is different than would otherwise obtain. This can increase oil production and reduce the weight of $C_{4+}$ hydrocarbons lost in the associated gas.

51 Claims, 16 Drawing Sheets

MEMBRANE SEPARATION OF ASSOCIATED GAS

FIELD OF THE INVENTION

The invention relates to oil and gas processing. In particular, the invention relates to improved membrane-based methods of treating hydrocarbon gases associated with wells and with crude oil processing.

BACKGROUND OF THE INVENTION

The raw fluid emerging at the wellhead is typically a high-pressure liquid/gas mixture. As the first stage in production of crude oil, the gas and oil phases must be separated. This is generally done in a series of phase separators operating at progressively lower pressures. Ideally, the end products of the phase separation are a crude oil product containing little or no methane, and an associated gas containing little or no $C_{4+}$ hydrocarbons.

The crude oil product will have a vapor pressure approximately equal to the pressure of the last phase separator at the operating temperature of the separator. Thus, the last separator is usually operated at close to atmospheric pressure. Removing the light hydrocarbons to lower the vapor pressure not only increases the value of the oil product, but also reduces potential problems caused by later off-gassing, as the pressure and temperature of the oil change during transport and storage.

The associated gas evolved during phase separation is often used as fuel at the well site, with the excess being flared. If the field is in a remote location far from markets for the gas, as may not infrequently be the case, it is impractical to further treat the gas. Thus, any heavier hydrocarbons remaining in this gas represent a loss of product, and the high Btu value may make it difficult to use the gas, even as an on-site fuel source. It is often desirable, therefore, to remove as much $C_{4+}$ hydrocarbon content from the gas phase as possible.

Even with multistage and carefully controlled phase separation, it is difficult to avoid retention of some lighter hydrocarbons ($C_1$–$C_2$ hydrocarbons) in the oil and some heavier hydrocarbons ($C_{4+}$ hydrocarbons) in the gas. Condensation is widely used in the industry to further treat the gas stream from the phase separators. This produces a liquid condensate enriched in heavier hydrocarbons that can be returned to the phase separtors or itself submitted to further treatment, such as distillation, to achieve additional separation of the lighter components from the heavier components.

Since all of these treatment steps often themselves require multiple steps, the preparation of a stable crude oil usually demands a fairly long and complicated treatment train. The various compression, recompression and cooling operations consume large amounts of energy, and the plant equipment can be large, heavy and costly.

An alternative processing technique that offered opportunities to reduce the size, complexity and cost of the treatment plants, and/or improve product quantity or quality, would be of benefit to the industry, particularly for use on off-shore platforms.

That membranes can separate $C_{4+}$ hydrocarbons from gas mixtures, such as natural gas, is known, for example from U.S. Pat. Nos. 4,857,078, 5,281,255 and 5,501,722. Likewise, it has been recognized that condensation and membrane separation may be combined, as is shown in U.S. Pat. Nos. 5,089,033; 5,199,962; 5,205,843 and 5,374,300. However, to applicants' knowledge, membrane separation has not been used for associated gas treatment.

SUMMARY OF THE INVENTION

The invention is an improved process for treating the gas that is evolved from the phase separators during gas/oil separation, so as to separate the very light hydrocarbon gases, methane in particular, from the heavier hydrocarbons. The goal is to use a membrane process to alter the equilibrium oil and gas compositions under the phase separation conditions. One possible result is to increase the amounts of the $C_{4+}$ heavier hydrocarbon components that drop out in the oil phase, thereby increasing the oil yield without having to change the pressure and temperature conditions of phase separation.

Another result is to provide improved techniques and capability to achieve a stabilized crude oil product, that is, a crude oil product with a vapor pressure at or below ambient pressure under storage or transport conditions.

In other words, the invention provides demethanizer capability by means of a simple membrane operation, rather than a costly and complicated distillation column or equivalent.

In its most basic embodiment, the process of the invention involves two integrated operations, phase separation and membrane separation. The phase separation operation is similar to phase separation performed in prior art processes in some aspects, insofar as it involves reducing the pressure of the stream from the well in one or more increments down to about atmospheric pressure, and the resulting formation of distinct gas and oil phases, which are drawn off as separate streams from the phase separation vessels.

The invention differs from prior art processes in that at least one gas stream from the phase separators is treated by membrane separation. This creates a light gas stream, which has an enriched methane content and a depleted $C_{4+}$ hydrocarbon content, and a heavy gas or vapor stream, which has an enriched $C_{4+}$ hydrocarbon content and a depleted methane content. Most widely useful embodiments of the invention include a condensation step between the phase separation and membrane separation operations. In this case, the gas stream from the phase separator is compressed and cooled to remove a portion of the heavier hydrocarbons as a liquid condensate. The remaining non-condensed portion of the gas stream passes on to be treated by membrane separation and, as before, is separated into light and heavy streams.

The phase separation operation further differs from prior art processes in that the heavy gas from the membrane separators is returned to the phase separation operation. This is preferably done in such a way as to bring the return gas stream and the liquid stream passing through the separators into equilibrating contact, explained in the Detailed Description section below. This is an important distinction over the prior art, because it can establish a vapor/liquid equilibrium in the phase separation operation that is different than would otherwise obtain in the phase separation operation under the same conditions of pressure and temperature. The result is transfer of more methane and less $C_{4+}$ hydrocarbon by weight into the gas stream than would previously have occurred at the prevailing pressure and temperature conditions. In other words, the oil stream from the separator contains less of the very light hydrocarbons than would occur without the membrane separation step, that is, the oil phase is demethanized.

The invention in the less common form in which the condensation step is omitted thus includes the following steps:

(a) subjecting the fluid for treatment to phase separation by pressure reduction, in a series of phase separation sub-steps at progressively lower pressures, from a highest pressure phase separation sub-step to a lowest pressure phase separation sub-step, each sub-step producing an oil stream and a gas stream, wherein the oil stream from one sub-step is fed to the next sub-step;

(b) subjecting at least one of the gas streams to membrane separation, thereby producing a light stream enriched in methane, and a heavy stream enriched in $C_{4+}$ hydrocarbon content, compared with the gas stream that is fed to the membrane unit;

(c) returning the heavy stream to bring it into equilibrating contact with at least a portion of the fluid undergoing one of the phase separation sub-steps; and (d) withdrawing the oil stream from the lowest pressure phase separation sub-step as a crude oil product.

The invention in the more generally useful form includes the following steps:

(a) subjecting the fluid for treatment to phase separation by pressure reduction, in a series of phase separation sub-steps at progressively lower pressures, from a highest pressure phase separation sub-step to a lowest pressure phase separation sub-step, each sub-step producing an oil stream and a gas stream, wherein the oil stream from one sub-step is fed to the next sub-step;

(b) subjecting at least one of the gas streams to condensation by compression and cooling, thereby removing a portion of the $C_{4+}$ hydrocarbon content as a liquid condensate, and leaving a non-condensed stream;

(c) subjecting the non-condensed stream to membrane separation, thereby producing a light stream enriched in methane, and a heavy stream enriched in $C_{4+}$ hydrocarbon content, compared with the non-condensed stream;

(d) returning the heavy stream to bring it into equilibrating contact with at least a portion of the fluid undergoing one of the phase separation sub-steps; and (e) withdrawing the oil stream from the lowest pressure phase separation sub-step as a crude oil product.

Steps (b) and (c), condensation and subsequent membrane separation of the non-condensed gas, can be performed on one, some or all of the gas streams from the individual phase separators. It is often beneficial to treat the gas stream coming from the last, lowest-pressure separator in this way, since this gas stream is the one most rich in $C_{4+}$ hydrocarbons. Furthermore, establishing a different vapor/liquid equilibrium in the last phase separator can create a stable oil product with a sub-atmospheric vapor pressure.

Alternatively, the gas streams from the several separators can be repressurized as necessary, pooled and the combined stream treated by membrane separation, or membrane separation combined with condensation, with the resulting heavy gas stream returning to the last separator. As yet another alternative, several membrane separation units may be used to treat streams from certain or all of the phase separators individually, creating individual heavy gas return streams, or the streams may be combined in any convenient combinations for treatment.

The decision as to which stream or streams to treat in any particular case is likely to be influenced by the increased operating power requirements, as discussed and illustrated below.

Other streams within the overall process train may also be subjected to membrane separation treatment.

These treatment options bring a number of advantages. With certain raw feeds, it may be possible to produce a crude oil of acceptable vapor pressure, that is hydrocarbon content, just by carrying out a very simple phase separation plus membrane separation process. This can bring significant savings in equipment cost, weight and complexity, as well as operating costs and energy requirements, compared with prior art processes. This is particularly useful for off-shore wells and wells in remote locations. In other cases, the inclusion of the membrane separator can reduce the demands on the condensation and phase separation steps to achieve a comparable product. In the case of existing prior art units, retrofitting with membrane units can increase the oil yield under existing pressure and temperature conditions.

To applicants' knowledge, such integrated processes and their inherent advantages have not previously been available for associated gas separation.

The process of the invention may be applied to a range of raw fluid compositions, including both those high in methane and ethane content and those high in heavier hydrocarbon content. Although the processes have been developed principally for use in crude oil production, and are described herein in detail mostly as they relate thereto, it should be appreciated that such a process is useful wherever high-pressure gas/liquid mixtures of hydrocarbons are encountered.

In another aspect, the invention is an apparatus for carrying out the processes outlined above.

It is to be understood that the above summary and the following detailed description are intended to explain and illustrate the invention without restricting its scope.

DETAILED DESCRIPTION OF THE INVENTION

The term gas as used herein means a gas or a vapor.

The terms $C_{4+}$ hydrocarbon and heavier hydrocarbon mean a hydrocarbon having at least four carbon atoms.

Percentages herein are by volume unless otherwise stated.

The invention is a process for treating hydrocarbon streams, such as streams from oil wells or the like, to separate the very light hydrocarbons, methane in particular, from the heavier $C_{4+}$ hydrocarbons. The invention involves using membrane separation in an integrated manner with other processing steps to treat gas evolved during gas/liquid phase separation. As stated above, the goal is to produce a stable crude oil product, that is, a crude oil with a vapor pressure close to atmospheric pressure or preferably below atmospheric pressure, preferably in increased amounts than previously possible.

Figure 1:
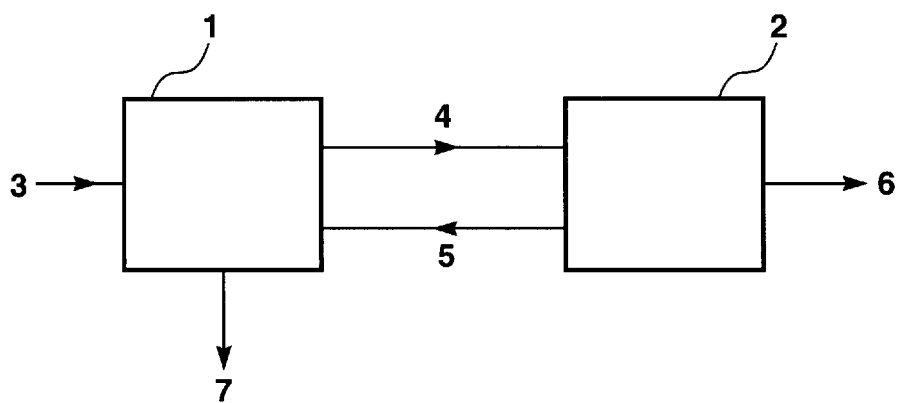
FIG. 1 is a diagrammatic representation of a basic process of the invention.

In its most basic embodiment, the process of the invention involves two integrated operations, gas/liquid phase separation and membrane separation, as shown diagrammatically in FIG. 1, where box 1 represents the phase separation step and box 2 represents the membrane separation step. An incoming stream to be treated, stream 3, passes first to the phase separation step, producing liquid stream 7. Gas that has been separated from the liquid passes as stream 4 to the membrane separation step, which produces two gas streams, 6 and 5. Stream 5 is returned to the phase separation step.

Figure 2:
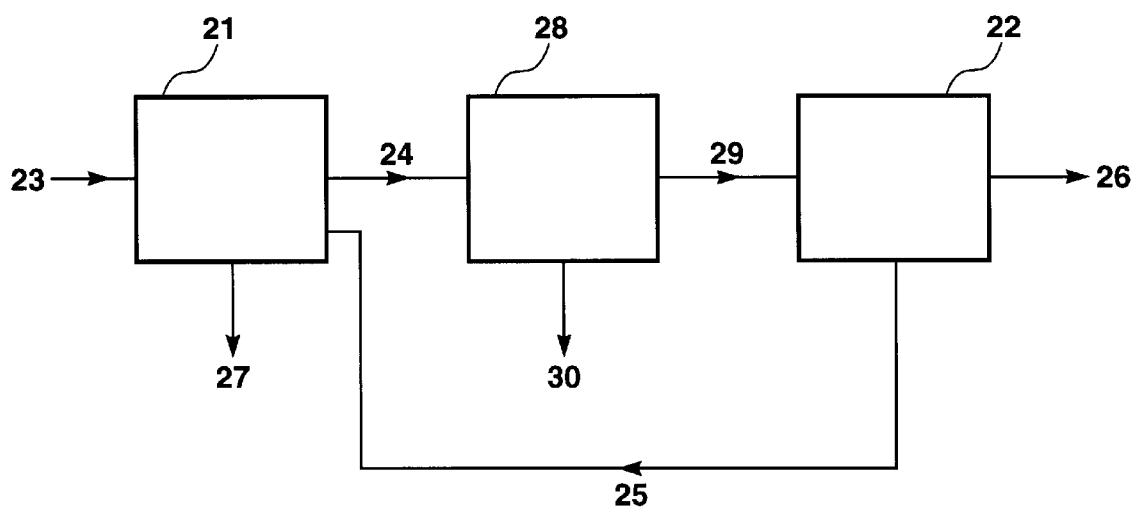
FIG. 2 is a diagrammatic representation of an alternative process of the invention.

In the more widely useful embodiment, a condensation step is included between the phase separation and membrane separation operations. FIG. 2 shows such a process in diagrammatic form. Turning to FIG. 2, box 21 represents the phase separation step, box 22 represents the membrane separation step and box 28 represents the condensation step. An incoming stream to be treated, stream 23, passes first to the phase separation step, producing liquid stream 27. The gas coming from the phase separation step, stream 24, passes to the condensation step. Here the gas is compressed and cooled to remove a portion of the heavier $C_{4+}$ hydrocarbons as a liquid condensate, stream 30. The remaining non-condensed portion of the gas stream, stream 29, passes on to be treated by membrane separation to yield streams 25 and 26 and, as before, the heavy stream from the membrane separation, stream 25, is returned to the phase separation operation.

Since the interaction of the return stream, 5 in FIG. 1 and 25 in FIG. 2, from the membrane separation step has an important effect on the phase separation step, the invention may best be understood by describing the membrane separation step first.

The Membrane Separation Step

Turning now to this step, the membrane separation operation is carried out using a membrane unit that contains a membrane that exhibits a substantially different permeability for the $C_{4+}$ hydrocarbons than for methane. It may be relatively permeable to the $C_{4+}$ hydrocarbons but relatively impermeable to methane, that is, selective for the $C_{4+}$ hydrocarbons over methane, or relatively permeable to methane but relatively impermeable to the $C_{4+}$ hydrocarbons, that is selective for methane over the $C_{4+}$ hydrocarbons.

The permeability of a gas or vapor through a membrane is a product of the diffusion coefficient, D, and the Henry's law sorption coefficient, k. D is a measure of the permeant's mobility in the polymer; k is a measure of the permeant's sorption into the polymer. The diffusion coefficient tends to decrease as the molecular size of the permeant increases, because large molecules interact with more segments of the polymer chains and are thus less mobile. The sorption coefficient depends, amongst other factors, on the condensability of the gas.

Depending on the nature of the polymer, either the diffusion or the sorption component of the permeability may dominate. In rigid, glassy polymer materials, the diffusion coefficient tends to be the controlling factor and the ability of molecules to permeate is very size dependent. As a result, glassy membranes tend to permeate small, low-boiling molecules, such as methane or ethane, faster than larger, more condensable molecules, such as the $C_{4+}$ hydrocarbons butane, pentane, hexane and so on. For rubbery or elastomeric polymers, the difference in size is much less critical, because the polymer chains can be flexed, and sorption effects generally dominate the permeability. Elastomeric materials, therefore, tend to permeate large, condensable molecules faster than small, low-boiling molecules.

A choice can therefore be made whether to use a glassy or an elastomeric membrane for the membrane separation step. Generally, we prefer to use an elastomeric membrane, so that the $C_{4+}$ hydrocarbon components are preferentially permeated and enriched in the permeate stream. Since the $C_{4+}$ hydrocarbons usually make up less than 50 vol % of the stream from the phase separators, a separation done in this manner typically uses less membrane area than a separation in which the bulk of the stream to be treated has to pass through the membrane. Also, elastomeric membranes usually have the benefit of higher fluxes than glassy membranes.

Examples of polymers that can be used to make elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, thermoplastic polyolefin elastomers, and block copolymers of polyethers, polyamides and polyesters.

An exception to the general guidelines above is the use of super-glassy polymer membranes to remove $C_{4+}$ hydrocarbon components preferentially. Super-glassy polymers have a rigid structure, high glass transition temperatures, typically above 100° C., 200° C. or higher, and would normally be expected to be selective for smaller, less condensable molecules over larger, more condensable molecules. However, membranes made from certain of these polymers that have unusually high free volume within the polymer material have been found to exhibit anomalous behavior, in that they preferentially permeate larger, more condensable molecules over smaller, less condensable molecules. The best known super-glassy polymer identified to date is poly (trimethylsilylpropyne) [PTMSP], the use of which to preferentially separate condensable components from lower-boiling, less condensable components is described in U.S. Pat. No. 5,281,255, for example. This type of membrane would be useful in the present invention as a membrane selective for $C_{4+}$ hydrocarbons over methane.

Although $C_{4+}$ hydrocarbon selective membranes are generally preferred for the reasons stated, embodiments using membranes selectively permeable to methane are within the scope of the invention. An example of a circumstance in which methane-selective membranes might be used is in a plant where the gas coming off the phase separation step still contains substantially more than 50 vol % $C_{4+}$ hydrocarbons. A second example might be situations where it is desired to keep the $C_{4+}$ hydrocarbon enriched stream at high pressure, and where it is acceptable to retrieve the associated gas at low pressure.

Examples of polymers that can be used to make glassy membranes include, but are not limited to, polysulfones, polyimides, polyamides, polyaramides, polyphenylene oxide, polycarbonates, ethylcellulose or cellulose acetate.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties. If glassy membranes are used, an integral asymmetric membrane is the preferred form.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice.

Whatever their composition and structure, the membranes should preferably have a selectivity for n-butane over methane, or alternatively for methane over n-butane, as measured with gas mixtures, of at least about 5.

To achieve a high flux of the preferentially permeating component, the membrane layer responsible for the separation properties should be thin, preferably, but not necessarily, no more than 30 $\mu$m thick, more preferably no more than 20 $\mu$m thick, and most preferably no more than 5 $\mu$m thick. If super-glassy membranes are used, the membranes may be thicker, such as 50 $\mu$m thick or even substantially more, such as 100 $\mu$m or more, because these membranes have extraordinarily high transmembrane fluxes.

A driving force for transmembrane permeation is typically provided by a pressure difference between the feed and permeate sides of the membrane. This pressure difference can be achieved by compressing the feed stream, by drawing a vacuum on the permeate side of the membrane, or both. In general, it is preferred to operate the membranes by pressurizing the feed side and by maintaining the permeate side at atmospheric pressure, or at the pressure of the appropriate phase separation step to which the permeate will be returned, if this is not atmospheric. In this way, the permeate stream can be returned to the phase separation operation without, or with only minor, pressure adjustment. However, the manner in which the transmembrane driving force is achieved is not a critical part of the invention, and any convenient means for maintaining a suitable driving force across the membranes is within the scope of the invention.

Referring again to FIGS. 1 and 2, the membrane separation step produces two streams, 5 and 6 in FIG. 1, and 25 and 26 in FIG. 2. Streams 6 and 26 are the associated gas stream; if $C_{4+}$ hydrocarbon selective membranes are used, this stream is the residue stream; if methane-selective membranes are used, this stream is the permeate stream. Streams 5 and 25 are the $C_{4+}$ hydrocarbon enriched stream; if $C_{4+}$ hydrocarbon selective membranes are used, this stream is the permeate stream; if methane-selective membranes are used, this stream is the residue stream.

A single-stage membrane separation operation using a membrane with a selectivity of about 10 can typically remove up to about 80 or 90% of the preferentially permeating component from the feed stream and produce a permeate stream that has five times or more the concentration of that component of the feed gas. This degree of separation is adequate for many applications. If the light associated gas stream requires further purification, it may be passed to a second bank of modules for a second processing step. If the heavier hydrocarbon enriched stream requires further concentration, it may be passed to a second bank of modules for a second-stage treatment. Such multistage or multistep processes, and variants thereof, will be familiar to those of skill in the art, who will appreciate that the membrane separation step may be configured in many possible ways, including single-stage, multistage, multistep, or more complicated arrays of two or more units in series or cascade arrangements. Such arrangements are explained in detail in U.S. Pat. No. 5,256,295, incorporated herein by reference in its entirety.

Those of skill in the art will further appreciate that the exact configuration and performance of the membrane separation step should be chosen in accordance with the teachings above to best fit the specific environment in which the process is being used. As a guideline, in many cases even extremely modest incremental improvements, such as reducing the $C_{4+}$ hydrocarbon content of the gas that is treated by the membrane by only 5% or 10% can be beneficial in terms of overall productivity and cost effectiveness to the oil producer. However, much higher levels of removal, such as 50%, 90% or above are obviously desirable if other constraints permit.

A particular feature of the invention, especially in embodiments that use heavier hydrocarbon selective membranes, is that the composition of the associated gas stream can be adjusted to any value desired by varying the parameters of the membrane separation step. Thus the $C_{4+}$ hydrocarbon content of the associated gas leaving the membrane separation step can be reduced to less than 1 mol %, a degree of purity that may not be possible to achieve by phase separation alone, or by phase separation followed by condensation treatment of the gas phase, at least under realistic pressure and temperature operating conditions. This can be achieved by increasing the membrane area used to perform the separation. As the membrane area is increased, the amount of gas passing through to the permeate side increases, and the greater is the removal of the heavier components from the feed gas stream. As a result, however, the permeate stream is less concentrated in $C_{4+}$ hydrocarbons, necessitating a larger compressor upstream of the membrane unit to deal with the larger amounts of recirculating light gases. In situations where greater compressor capacity can be provided, however, this ability to tailor the associated gas composition is very useful.

The Phase Separation Step

Stream 5 or stream 25, the $C_{4+}$ hydrocarbon enriched stream, is the stream that is returned to the phase separation step. This stream has been enriched in heavier hydrocarbon content by withdrawing methane during the membrane separation step, and so may typically contain 10 mol %, 20 mol % or more of $C_{4+}$ hydrocarbons, depending on the composition of the stream being treated and the operating parameters of the system. It should be noted that this means that this stream will likely still contain fairly large amounts of the lighter $C_1$–$C_3$ hydrocarbons, such as of the order 80 mol % or more. This is markedly different from the streams that are returned to the phase separation step in prior art processes. In that case, the return streams are usually liquid condensate streams or distillation column bottom streams. Not only are these liquid, whereas the return stream from the membrane separation step is a gas or vapor, but they are usually considerably higher in $C_{4+}$ hydrocarbon content. Return of stream 5 would appear counterproductive, since it has the effect of returning significant amounts of gaseous methane to a stream from which considerable efforts are being made to remove it. However, we have recognized that this gaseous stream can be put to good use to provide an improved gas/oil separation process.

This is done by bringing the return gas stream and the liquid stream passing through the phase separation operation into equilibrating contact. By this we mean that the contact between the two streams enables mass transfer of heavier components from the return gas into the liquid phase and transfer of light components from the liquid into the gas phase. Thus, the return of the heavy gas stream provides what amounts to a combined absorption and stripping interaction between the return stream and the feed stream as it passes through the phase separation step. This establishes a different vapor/liquid equilibrium in the phase separation step at a given pressure and temperature than would otherwise obtain. In other words, the vapor/liquid equilibrium in the phase separation step is shifted in the direction of greater removal of light hydrocarbons into the gas phase and greater retention of heavier hydrocarbons in the liquid phase. Calculations demonstrating this effect are given in the Examples section below. In this way, the process can produce an oil product containing a low level of light hydrocarbon; that is, with a low vapor pressure, and an associated gas product containing a low level of heavier hydrocarbons. Thus, the membrane serves as a simple but effective demethanizer.

Figure 7:
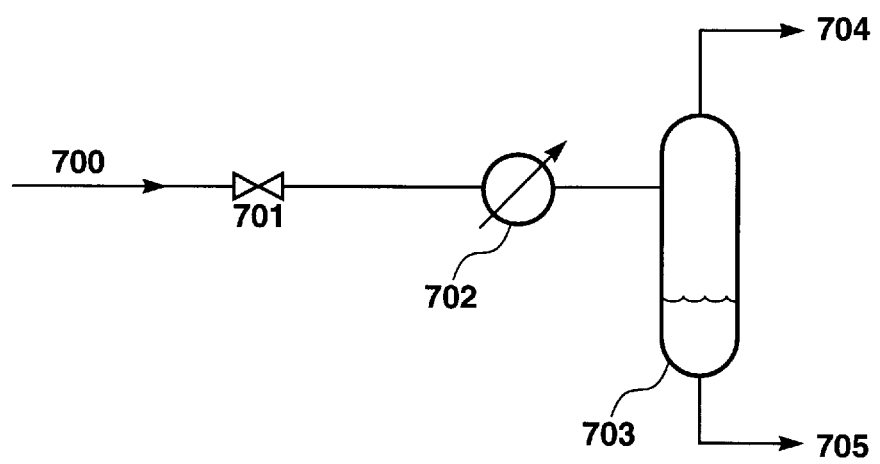
FIG. 7 is a schematic drawing of a conventional phase separator.

The equilibrating contact between the streams, which can be made either between the return gas and the raw fluid before it has been split into gas and liquid portions, or between the return gas and one of the liquid portions of the stream as it undergoes the phase separation stages, can be established in a variety of ways. Some representative, but non-limiting, configurations are shown in FIGS. 8–11. Before turning to these figures, for reference FIG. 7 shows a schematic representation of a typical prior art phase separation step. Feed 700 at high pressure passes through expansion valve 701, where the pressure is lowered, typically by 200–500 psi. Vaporization of a portion of the light components causes the mixture to cool. The mixture is usually reheated, to ambient temperature or above, such as 50° C., by passing through a heater 702, and then enters the phase separation vessel 703. Here the two phases reach an approximate equilibrium before being withdrawn as gas 704 and oil 705.

Turning now to FIGS. 8–11, in all cases the return heavy gas stream from the membrane unit is brought into equilibrating contact with the oil stream to produce gas streams that contain less heavy hydrocarbon and oil streams that contain less light hydrocarbon than would be achieved from the unit of FIG. 7, if maintained at the same temperature and pressure.

Figure 8:
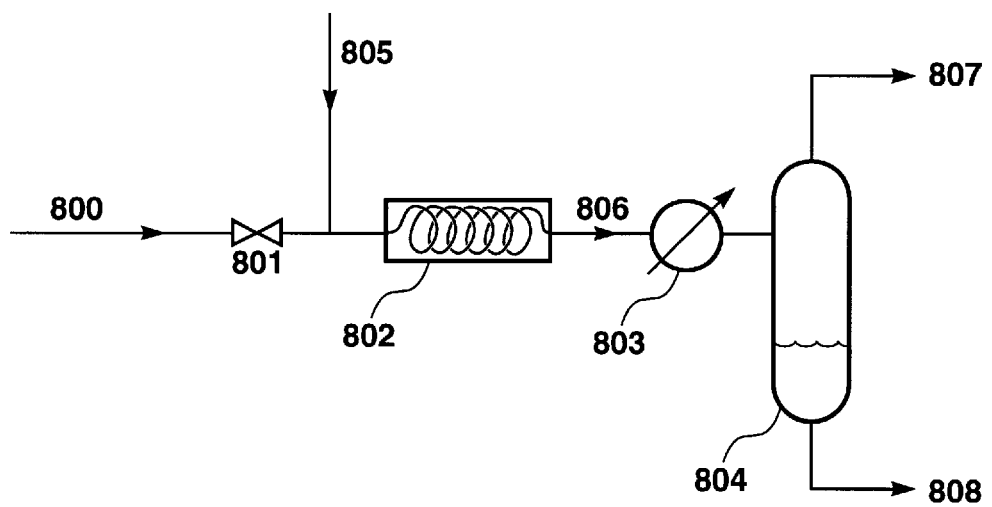
FIG. 8 is a schematic drawing of a phase separator in which equilibrating contact being achieved by means of a motionless mixer.
Figure 9:
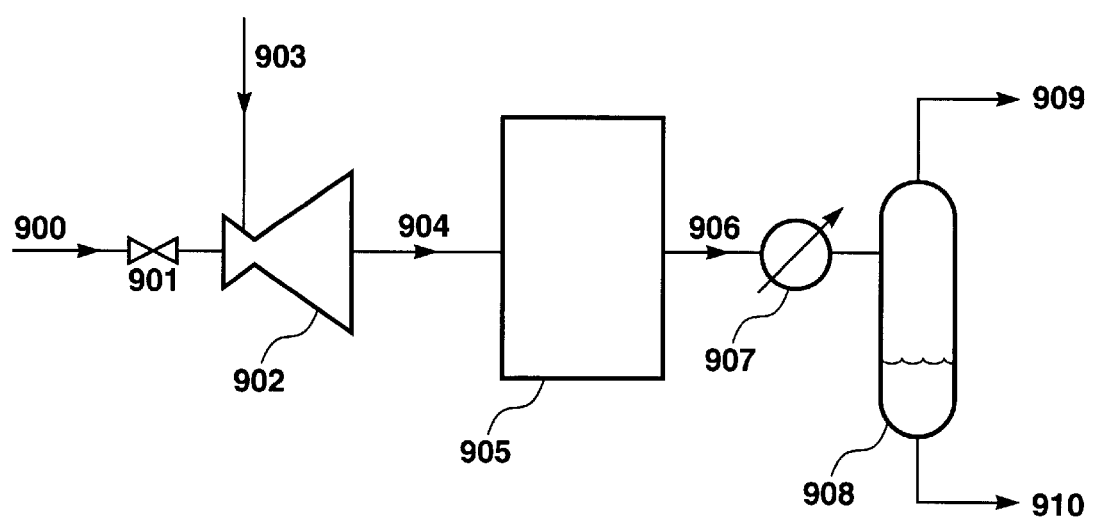
FIG. 9 is a schematic drawing of a phase separator in which equilibrating contact being achieved by means of an eductor.

FIGS. 8 and 9 show the return heavy stream and the portion of the raw stream under treatment being mixed before the stream under treatment is brought into the phase separation vessel for that stage. FIG. 8 shows equilibrating contact being achieved by running the raw incoming stream and the return gas stream together through a motionless, in-line, mixer. Feed 800 at high pressure passes through expansion valve 801. Return gas stream 805 and feed stream 800 pass together into motionless mixer 802. Feed stream 800 is cooled by expansion through the valve and is able to absorb a portion of the $C_{4+}$ hydrocarbons in stream 805. After emerging from the mixer, the stream 806 is warmed in heater 803 and then enters the phase separation chamber 804. Gas and oil phases are withdrawn separately as streams 807 (gas) and 808 (oil).

FIG. 9 shows equilibrating contact being achieved by running the raw incoming stream and the return gas stream together through an eductor. Feed 900 at high pressure passes through expansion valve 901 and thence into eductor 902. Return gas stream 903 is drawn into the eductor as shown and the mixed streams exit together as stream 904. This stream passes into tank 905, which is preferably equipped with baffles and/or other contact-promoting equipment. From here the equilibrated mixture 906 is warmed in heater 907 and then enters the phase separation chamber 908. Gas and oil phases are withdrawn separately as streams 909 (gas) and 910 (oil).

The methods of establishing equilibrating contact shown in FIGS. 8 and 9 use simple pieces of equipment, with few, if any, moving parts, that operate in a straightforward manner with little or no operator attendance and have low maintenance needs. These types of phase separation equipment are particularly suited for operation on small streams where the economics cannot support units that are costly to install, operate or maintain, and at remote fields, where operators and maintenance personnel cannot be on site continuously. They are useful for off-shore platforms, where complexity and weight of equipment are important engineering issues. They also provide a convenient method of providing the equilibrating contact of the invention by means of a retrofit to existing units already equipped with phase separation apparatus of the type shown in FIG. 7. However, equipment such as that shown provides only one theoretical partitioning stage for separating the gas and liquid phases. Although this establishes a different and improved equilibrium over that provided according to FIG. 7, the separation of light and heavy components is less perfect than would be possible if more theoretical separation stages could be provided.

Figure 10:
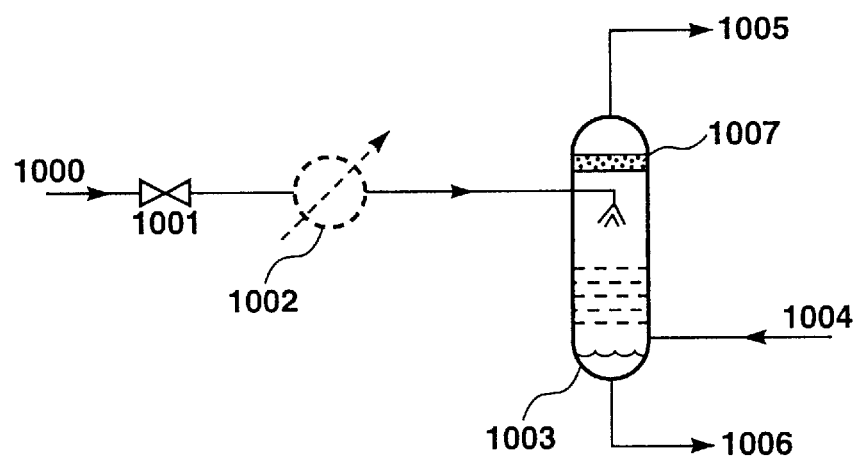
FIG. 10 is a schematic drawing of a phase separator in which equilibrating contact being achieved by means of a stripping/absorption unit.
Figure 11:
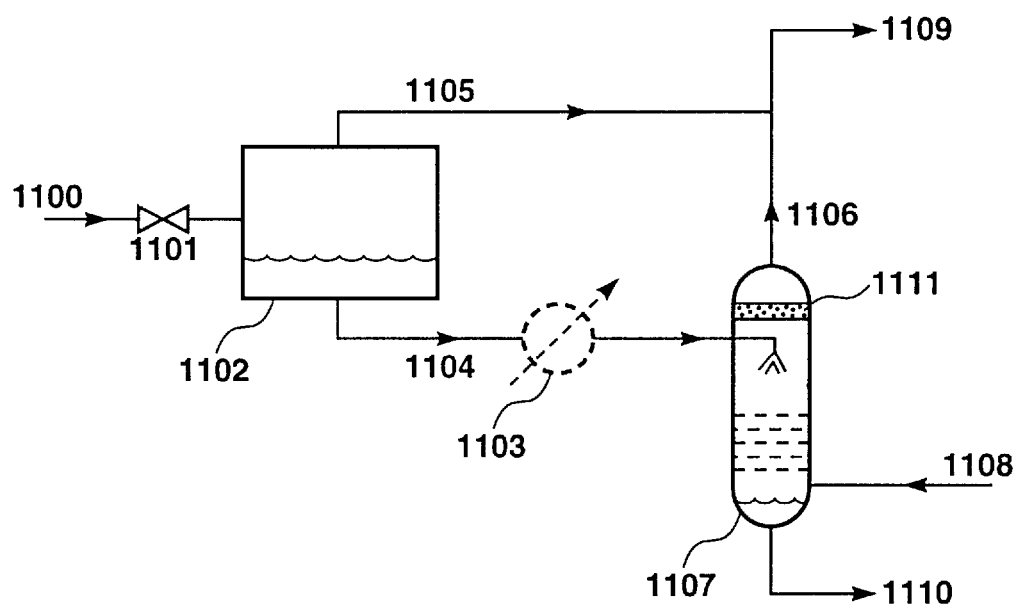
FIG. 11 is a schematic drawing of an alternative phase separator in which equilibrating contact being achieved by means of a stripping/absorption unit.

More preferred, assuming other considerations permit, are the equilibrating means of FIGS. 10 and 11, in which contact between the streams and gas/liquid separation take place in a contacting column or tower. These arrangements can achieve multiple theoretical partitioning stages, compared with only one theoretical stage for the simple arrangements of FIG. 8 and 9. As shown in the Examples section below, as few as five or even three theoretical stages suffices for very good exchange of light components into the gas stream and of $C_{4+}$ hydrocarbon components into the oil stream.

FIG. 10 shows a design in which feed 1000 at high pressure passes through expansion valve 1001 and thence into a unit 1003, which provides the potential for a combined absorption/stripping exchange between the contacting streams.

Although the unit is shown in the figure as having five trays, it may be of any type, and of any flow configuration, that enables good contact to be achieved between the oil under treatment and the return gas stream. Examples include spray towers, trayed towers and packed towers. In a spray tower, the liquid is broken into fine droplets by pumping it through nozzles. The gas is passed up through the tower, normally countercurrent to the descending spray. In a trayed tower, gas is bubbled through liquid in a series of aeration trays. Since few stages are needed, a low-profile trayed stripper may be used. In a packed tower, a packing medium is used to maximize the gas/liquid contact surfaces. The oil under treatment is more viscous than liquids normally treated in strippers. If a packed tower is used, the packing should, therefore, be fairly coarse.

The preferred operating configuration is countercurrent, as shown, in which oil passes from top to bottom of the tower and gas passes from bottom to top. Other configurations, for example, crossflow, in which oil passes from top to bottom and gas flows in at the sides, to the center and then out at the top, may also be used.

As the return gas stream 1004 travels up the tower, heavy hydrocarbons are absorbed into the oil phase and light hydrocarbons are stripped into the gas phase. The oil in equilibrium with the upflowing gas is withdrawn from the bottom as stabilized oil stream 1006; the gas is withdrawn from the top as stream 1005. In this design heater 1002 is optional; raising the temperature of the oil prior to the absorption/stripping step reduces its viscosity and facilitates stripping. Mist coalescer 1007 at the top of the tower prevents carry over of oil mist into the product gas stream.

The design and engineering issues to be taken into account in absorption or stripping columns are well known in the art. More detailed information on practical design considerations may be found, for example, in "Handbook of Separation Techniques for Chemical Engineers", P. A. Schweitzer (Editor), McGraw-Hill, New York (1979) in Chapter 3.2, entitled "Design of Gas Absorption Towers", by F. A. Zenz.

FIG. 11 shows a design similar to that of FIG. 10, except that the raw feed stream 1100 is passed through expansion valve 1101 and thence into a separation vessel 1102, to produce a gas stream 1105 and a liquid stream 1104. The liquid stream is passed to tower 1107, where it flows downward countercurrent to return gas stream 1108. In this case, therefore, the equilibrating contact takes place between the oil portion of the raw stream and the return gas, rather than the entirety of the raw stream and the return gas. The oil is withdrawn from the bottom as stream 1110; the gas is withdrawn from the top as stream 1106, which may be mixed with the gas stream 1105 from the separation tank to form gas stream 1109. The optional heater is shown as 1103 and the mist coalescer as 1111.

The phase separation step has been described so far as a single operation. If the raw fluid to be treated is at modest pressure, it may be possible to carry out the phase separation using only one separation unit. Much more commonly, the phase separation step will be performed as a series of sequential sub-steps, such as two, three, four or more sequential steps, at progressively lower pressure. This reduces the recompression load involved in bringing the evolved gas up to pressure for further treatment. For example, if the raw fluid to be treated is at a pressure of around 500 psia, the phase separation may be done by passing the feed through an expansion valve and into a high pressure separator at 250 psia, then expanding the resulting partially processed crude oil stream from this separator into a second separator at 15 psia. If the raw fluid to be treated is at a pressure of around 1,000 psia, the phase separation may be done by passing the feed through an expansion valve and into a high pressure separator at 500 psia, then expanding the liquid from this separator into a second separator at 250 psia, and finally expanding the liquid from this separator into the last separator at 20 psia. Thus, each separator produces an oil stream or sub-stream and the oil sub-stream from one separator is fed to the next separator.

When multiple separators are used, each phase separator will also produce its own gas stream, and any or all of the gas sub-streams from the phase separators can be subjected to membrane treatment. It is beneficial and preferred, where possible, to treat the gas stream coming from the last, lowest-pressure separator. Since the separators are operated at progressively lower pressures, the gas stream from the last separator is the one most rich in $C_{4+}$ hydrocarbons, and, therefore, most in need of treatment. Treatment of this stream will result in a comparatively high additional oil recovery per unit membrane area used, as is illustrated for a unit having a representative four phase separation stages in Example 9 below. However, this oil recovery is obtained at comparatively larger compressor horsepower requirement, so may not be practical in all situations.

Alternatively, the gas streams evolved from the individual separators can be pressure-adjusted as necessary, optionally individually treated by condensation, then pooled and sent as one stream to the membrane separation step. This has the benefit of creating only one associated gas stream, and, as explained above, the membrane unit can be configured if desired to deliver this associated gas product stream with a very low $C_{4+}$ hydrocarbon content.

As yet another alternative, several membrane separation units may be used to treat the individual streams from one, some or all of the phase separators independently or in any desired combinations. It will be appreciated that not all of the very many possible process arrangements can be specifically shown or described, and that, once the general principles and teachings of the invention given herein have been understood, those of skill in the art will be able to select arrangements appropriate to any particular set of operating conditions and constraints without difficulty, for instance by carrying out the same kind of modeling calculations as in the examples.

Whether the membrane unit or units treats one, some or all of the streams from the phase separators, it is preferred to return the resulting heavy stream or streams to the last, lowest-pressure phase separator in the series, so that the equilibrating contact is established with the oil stream being fed to this separator. This provides the greatest pressure difference between the feed and permeate sides of the membrane. Also, this is the separator that produces the crude oil product, and establishing a different vapor/liquid equilibrium in this separator can create a stable oil product with a sub-atmospheric vapor pressure.

The conditions under which the last phase separator can be operated are another feature of the invention. In prior art phase separation, it is normal procedure to operate the last phase separator at close to atmospheric pressure, the goal being to create a crude oil that does not release large amounts of gas if the pressure drops or the temperature rises while the oil is being transported or stored. Of course, one way to reduce the content of the more volatile components would be to run the phase separators at sub-atmospheric pressure, but this is not normally done, because of the risk of air leaks and other practical considerations. More usually the separator is operated at higher than ambient temperature, such as at 40° or 50° C., for example, so that the oil has a sub-atmospheric vapor pressure when returned to ambient temperature. The disadvantage of raising the temperature, or lowering the pressure, is that this drives off not only more of the light hydrocarbons, but also more of the $C_{4+}$ components, thereby losing valuable components, as well as producing a more contaminated associated gas. Using the process of the invention enables the phase separation operation to be more easily operated at warm temperatures, such as 50° C. or above, or even at sub-atmospheric pressure if desired. Although this tends to drive off more of the heavier hydrocarbons, the membrane separation step will return the heavy hydrocarbon components for partitioning back into the oil phase. Taking these factors into account, it is preferred to operate the lowest pressure phase separation step at a pressure no higher than about 50 psia, more preferably no higher than about 30 psia, and most preferably no higher than about 17 psia, and a temperature at least about 30° C., more preferably at least about 40° C., and most preferably at least about 50° C.

If multiple separators are used, the individual units may be of like or unlike types. For example, the last separator in the series may be a small absorption/stripping unit as described above, and the higher pressure separators may be of the standard flash vessel type.

The crude oil product, shown as stream 7 in FIG. 1, is the liquid product of the last separator. The desired vapor pressure of the oil at ambient temperature is less than 25 psia, more preferably less than 20 psia, and most preferably less than 10 psia. Those of skill in the art will appreciate that ambient temperature may be very different depending on location (Alaska or Saudi Arabia, for example) and time of year. Thus, these vapor pressure may be the target at 20° C. in some situation, but at 10° C., 30° C. or higher in others.

The Condensation Step

As was mentioned above, many or even most of the embodiments of the invention include a condensation step between the phase separation and membrane separation steps. The gas treated in the condensation step, stream 24 in FIG. 2, may be the gas evolved from the last separator, or may be any other individual or combined gas stream, including the pooled stream from all the separators.

In the condensation step, the gas is compressed and cooled to remove a portion of the heavier $C_{4+}$ hydrocarbons as a liquid condensate, stream 30. The remaining non-condensed portion of the gas stream, stream 29, passes on to be treated by membrane separation. It is desirable to avoid very high pressures and very low temperatures in the condensation step, since reaching these conditions requires larger, more powerful compressors and chillers, which adds to the cost and complexity of the process. By very high pressures, we mean pressures in excess of about 2,000 psia. Preferably, the pressure at which the condensation step is operated should be no more than about 1,500 psia, more preferably no more than about 1,000 psia and most preferably no more than about 500 psia.

By low temperatures, we mean temperatures below about 0° C. The temperature at which the condensation step is operated should more preferably be in the range 5° C. to 30° C. Temperatures in this range are normally reachable by air cooling, water cooling or simple one-stage refrigeration using a fluorocarbon refrigerant or the like. Sub-zero temperatures can be used, such as by using single-stage propane refrigeration, which will provide a temperature of about −40° C., but are less desirable, as the equipment needed to reach them adds substantially to both the capital and operating costs of the process. Also the gas must be absolutely dry before entering the chiller, to avoid ice and hydrate formation.

The fraction of the heavier hydrocarbon components remaining in the condenser vent gas after the condensation step depends on the vapor/liquid equilibrium at the operating conditions under which the condensation step is performed. If the $C_{4+}$ hydrocarbon dewpoint of the incoming stream is 50° C. at 250 psia, for example, then compressing the stream to 500–1,000 psia and cooling to 0°–10° C. can remove up to 80% or more of the component in question. It is theoretically possible to obtain as much removal as required by creating appropriate conditions of high pressure and low temperature.

In the practice of the invention, however, it is preferable only that the condensation step be designed to remove at least about 50% of the $C_{4+}$ hydrocarbon component present in the feed to the condenser, more preferably, at least about 70. Operation under extreme conditions to achieve 90% or more removal is unnecessary, because the process does not rely on condensation alone to achieve the overall separation. For example, suppose the condensation step removes 45% of the heavier hydrocarbon component of the feed gas reaching it. If the condensation step is followed by a membrane separation step that can remove 80% of the $C_{4+}$ hydrocarbon component reaching that step, then the total removal obtained is 89%. If the condensation step removes 60%, and is followed by a membrane separation step that removes 85%, then the total removal is 94%. If the condensation step removes 70% and the membrane separation step 90%, the total removal is 97%.

The condensation operation can be carried out in one step or a series of two, three or more sub-steps, each producing its own condensate and non-condensed streams. For example, the gas coming from the phase separator or separators may be subjected first to simple air- or water-cooling, which causes condensation of a part of the stream. The remaining gas may then be compressed and chilled to cause further condensation of the heavier components, and the remaining last high-pressure non-condensed gas stream passed on for treatment in the membrane separation step. Membrane steps can also be interposed between multiple condensation steps if desired.

The condensate stream or streams can pass to any destination, although normally we would return the condensate to the phase separators, either directly or after additional separation, as has conventionally been done in prior art processes. Typically, the condensate, which has a high $C_{4+}$ hydrocarbon content, can be returned to the last phase separator. Otherwise, the condensate can be returned to any separator at suitable pressure and containing an oil of suitable composition to receive it.

The processes of the invention have been described so far without mention of water as a component of the raw fluid leaving the well. As in prior art processes, the water that is essentially always present in the raw stream may be removed in various optional ways. If at least one of the separators used in the phase separation step is a three-phase separator, water can be drawn off at this point as is conventionally done. Water may be removed from the various gas streams as they pass through the rest of the process as necessary and convenient, such as by scrubbing with a glycol solution, or by any other method known in the art. Yet another particular feature of the invention, however, is that most polymeric membranes, whether elastomeric or glassy, are very permeable to water vapor. Water that remains in the gas stream passing to the membrane separation operation will, therefore, be carried through the membrane to the permeate side. The result is an essentially dry associated gas product stream. This is a useful benefit of the invention, since water is usually required to be removed down to the 100 ppm range if the gas is to be transported in a pipeline. The presence of the membrane unit reduces the load on other dehydration equipment, or means that ancillary dehydration units may be dispensed with in some cases. The possibility of being able to operate an offshore platform without dehydration equipment offers a significant weight/space and maintenance advantage.

It will be apparent to those of skill in the art from the description of the invention so far given that there are many possible process configurations in which membrane separation can be used in conjunction with phase separation to achieve beneficial results.

In all cases, the goal is to achieve a stabilized crude oil and an associated gas capable of being sent to the pipeline, usable on site, or at least in which waste of valuable $C_{4+}$ hydrocarbons is minimized. The destination of intermediate and recycle streams can be chosen to best fit good engineering principles and the specifics of the job. For example, as already mentioned, condensate streams can be remixed with any oil of appropriate pressure or composition. Where adjustments in pressure or temperature are needed, these can be made individually on a stream-by-stream basis or on pooled streams as convenient. Factors that may be taken into account in developing an efficient process flow scheme include: the composition and flow rate of the raw fluid; whether associated gases are to be pipelined, used locally, further treated, or simply flared; site-specific constraints on plant complexity; whether the process is for a new or existing well; availability of operating personnel; energy costs at site, and so on. Such considerations are familiar to design engineers and operators of gas and oil processing plants.

FIGS. 3–6, therefore, show representative, but non-limiting, most preferred embodiments for treating gas/oil mixtures of typical compositions and flow rates. Other arrangements than those specifically described will no doubt suggest themselves to those of skill in the art within the scope of the teachings herein.

Figure 3:
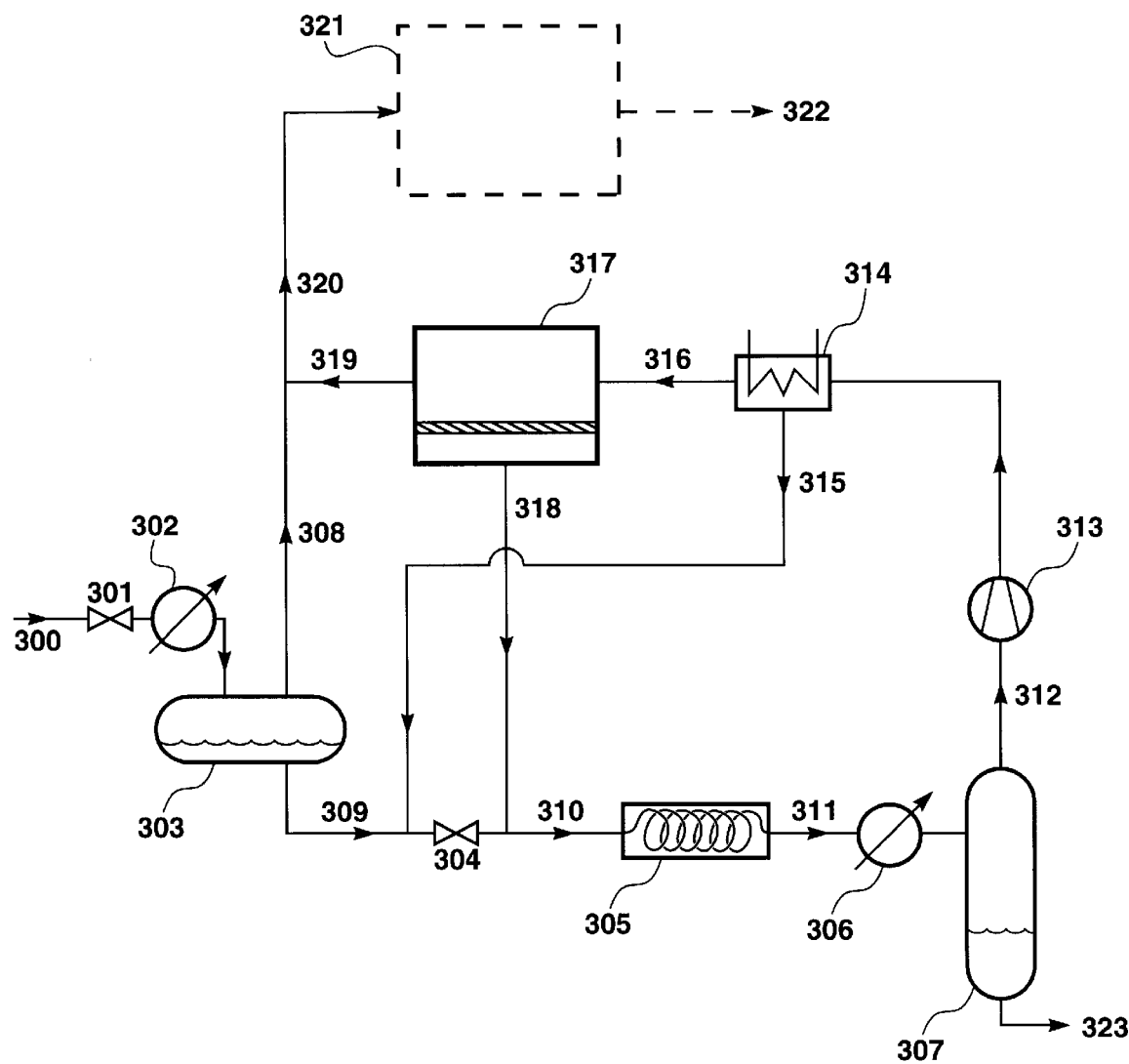
FIG. 3 is a schematic drawing of a preferred simple embodiment of the invention.

Turning now to FIG. 3, this shows in schematic form an extremely simple embodiment, particularly suited for use in handling small flow rates of associated gas, such as no more than the order of 10 million scfd. The raw fluid to be treated enters the process as stream 300. Two phase separation steps are used. The first is of the conventional type, as shown in FIG. 7 for example; the raw fluid is reduced in pressure by expansion valve 301 and warmed in heater 302 before passing into separation vessel 303. For simplicity, the figure shows the separator vessel as a two-phase separator, but a three-phase separator could be used, in which case water is withdrawn as a separate stream. Discrete oil stream 309 and gas stream 308 are evolved. Oil stream 309 passes to the second phase separation step, which uses a one-theoretical-stage contacting unit of the type shown in FIG. 8. The pressure of stream 309 is further reduced as it passes through expansion valve 304. The expanded stream and the return gas stream 318 from the membrane unit pass together as stream 310 into motionless mixer 305, exit as mixed stream 311, pass through heater 306 and thence into the second separator vessel 307. The crude oil product is withdrawn as stream 323 from this separator.

The evolved gases are withdrawn from each separator as high-pressure stream 308 and low-pressure stream 312. Stream 312 is repressurized to a pressure close to or a little above that of stream 308 by compressor 313, the pressure being chosen to accommodate any pressure drop expected across the feed side of the membrane system, so as to provide a residue stream 319 at about the same pressure as stream 308. The stream emerging from the compressor will be hot, such as at 100°C. or more, and is cooled in after-cooler or condenser 314, typically to about 30° C. or 40° C. Partial condensation occurs, and the condensate stream 315 is returned through valve 304 to the low pressure separator. The non-condensed stream 316 is passed to membrane separation unit 317, which in this illustration contains membranes selectively permeable to the heavier hydrocarbons. The heavier hydrocarbon enriched low-pressure permeate stream 318 is returned to the second phase separation step downstream of valve 304 for mixing with the liquids flowing into the separator as streams 309 and 315. Residue stream 319 is mixed with the high-pressure gas stream 308 from the first separator, to produce associated gas stream 320. If this stream does not meet specifications appropriate to its final destination, optional additional treatment, indicated by box 321, may be performed, to produce adjusted associated gas stream 322.

The embodiment of FIG. 3 is advantageous in that it uses only one compressor of modest capacity. All other equipment: separators, condensers and membrane modules, is made up of simple, low-maintenance units with no moving parts. Pressures and temperatures used to carry out the process are moderate. Such an embodiment is attractive for use in remote locations, where unattended operation is needed, and the simplicity of the process train is of benefit on off-shore platforms.

Figure 4:
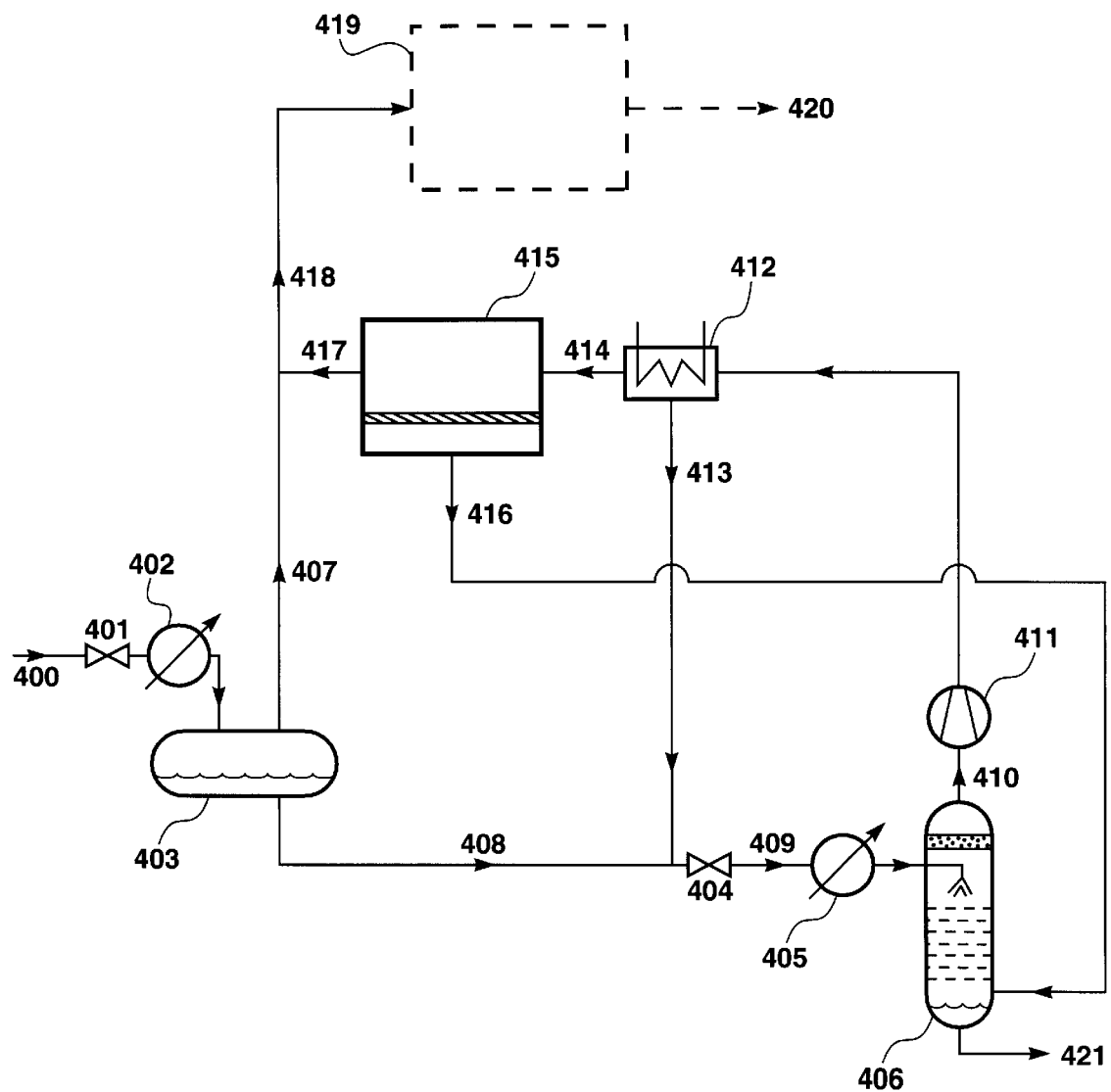
FIG. 4 is a schematic drawing of a preferred alternative embodiment of the invention.

Turning now to FIG. 4, this shows an embodiment that differs from the embodiment of FIG. 3 in that it uses a small, five-theoretical-stage stripping/absorption unit of the type shown in FIG. 10. In this case, feed stream 400 passes through expansion valve 401 and heater 402 into separation vessel 403, where streams 407 and 408 are produced. Stream 408 is combined with return stream 413 from the condenser and is reduced in pressure by expansion valve 404.

Resulting reduced pressure stream 409 passes through heater 405 and thence into the second, lower-pressure separator vessel 406. The crude oil product is withdrawn as stream 421 from this separator.

The evolved gases are withdrawn from each separator as high-pressure stream 407 and low-pressure stream 410. Stream 410 is repressurized by compressor 411 and cooled in after-cooler or condenser 412. The condensate stream 413 is returned through valve 404 to the low pressure separator. The non-condensed stream 414 is passed to membrane separation unit 415. Heavier hydrocarbon enriched stream 416 is returned as a stripping gas to separator 406. Residue stream 417 is mixed with the high-pressure gas stream 407 to form stream 418. Optional additional treatment 419 can be performed to produce adjusted associated gas stream 420.

The embodiment of FIG. 4 is more complicated than that of FIG. 3, insofar as the absorption/stripping conditions must be set to provide good exchange of heavier hydrocarbons into the downward-flowing liquid and of light hydrocarbons into the upward-flowing gas. Nevertheless, the unit itself is small and can operate under moderate pressure and temperature conditions without continuous monitoring.

One measure of the difference in performance that can be expected between the process configurations of FIGS. 3 and 4 can be estimated by comparing Examples 1(e) and (f) in the section below. The processes can achieve essentially equivalent results in terms of oil and gas production, but the process using multiple partitioning stages could achieve these results with much smaller membrane area and horsepower requirement.

The various preferred limitations, including but not limited to, operating pressure of the lowest pressure phase separator, vapor pressure of the product oil and effectiveness of the membrane in removing $C_{4+}$ hydrocarbons, discussed above in general, also apply to specific embodiments such as those of FIGS. 3 and 4.

Embodiments similar to those of FIGS. 3 and 4, but having three or more phase separation steps, are preferred when the feed is at high pressure. In this case, streams 300 and 400 may represent the liquid stream from the upstream separator or separators, which may be of any type, although most simply of the same type as separators 303 and 403, but operated at higher pressures. Alternatively or additionally, one or more separators could be positioned downstream of separators 307 or 406 to further treat streams 323 or 421.

Figure 5:
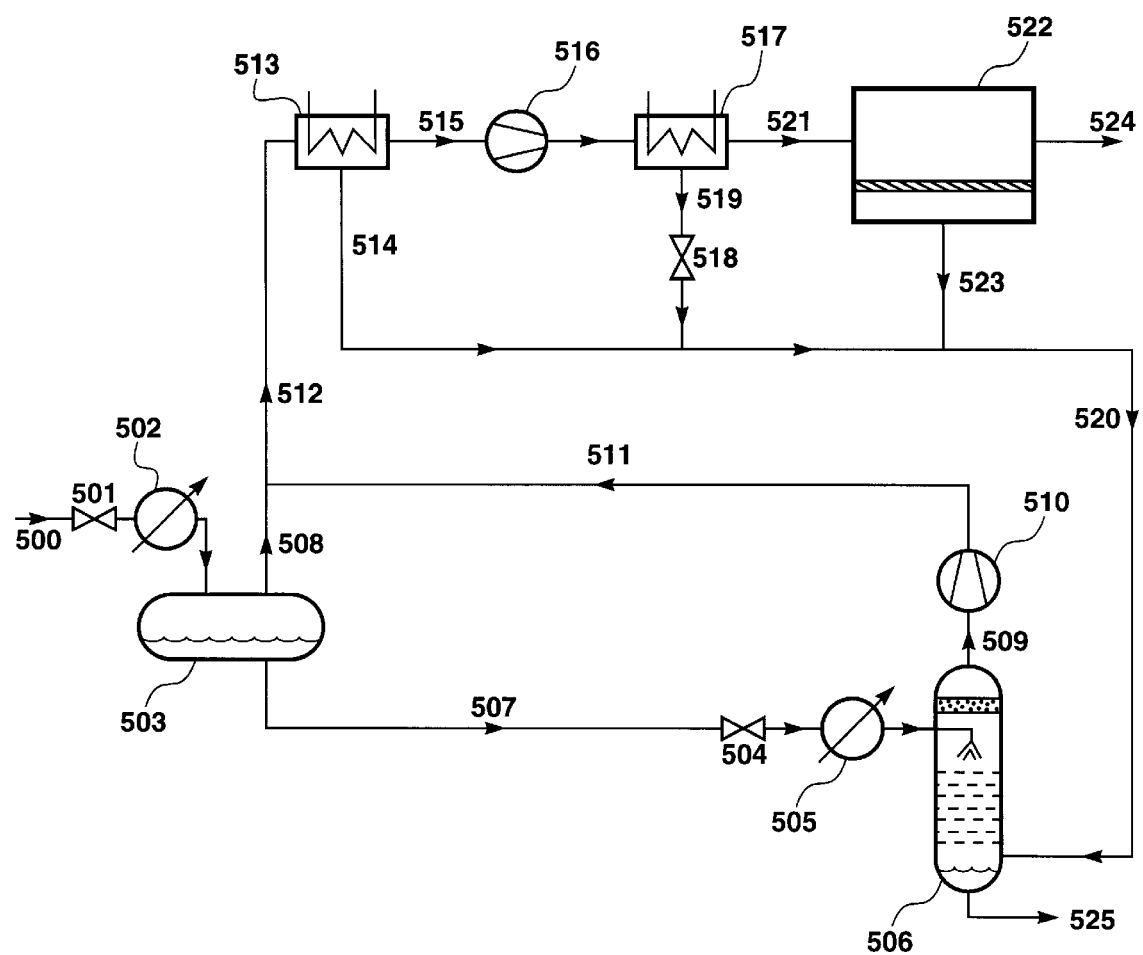
FIG. 5 is a schematic drawing of a preferred embodiment of the invention that treats streams from multiple phase separators.

A representative embodiment of a process for use when the gases from all phase separators need treatment, and where a larger plant is acceptable, is shown in FIG. 5. As in FIG. 4, the first phase separation step is of the prior art type; the second step uses a five-stage absorption/stripping contactor. Referring now to FIG. 5, stream 500 is reduced in pressure by expansion valve 501, heated by heater 502 and passed into separator 503, where discrete liquid stream 507 and gas stream 508 are evolved. The pressure of liquid stream 507 is further reduced as it passes through expansion valve 504 into heater 505 and second separator 506.

The evolved gases are withdrawn from each separator as high-pressure stream 508 and low-pressure stream 509. Stream 509 is repressurized by compressor 510 and the repressurized gas stream 511 is mixed with gas from the first separator to form raw associated gas stream 512. The raw stream is cooled in after-cooler or condenser 513, such as to about 30° C. Partial condensation occurs, producing condensate stream 514. The non-condensed stream 515 is compressed in compressor 516 and chilled in condenser 517. Part of the condenser cooling can be achieved by running the stream against other cold streams, such as the membrane permeate and residue stream, in heat-exchangers. For simplicity, this is not shown in the figure. Additional cooling is provided by a refrigerated chiller. The pressure of condensate stream 519 is lowered by valve 518 and this stream is combined with condensate stream 514 and permeate stream 523 to form stream 520. Non-condensed stream 521 is passed to membrane separation unit 522 for treatment. The heavier hydrocarbon enriched, low-pressure permeate stream 523 is mixed with condensate streams 514 and 519 and returned as stripping gas to the bottom of absorber/stripper 506. The stabilized crude oil product is withdrawn as bottom product stream 525. The treated associated gas product stream is withdrawn as residue stream 524.

Figure 6:
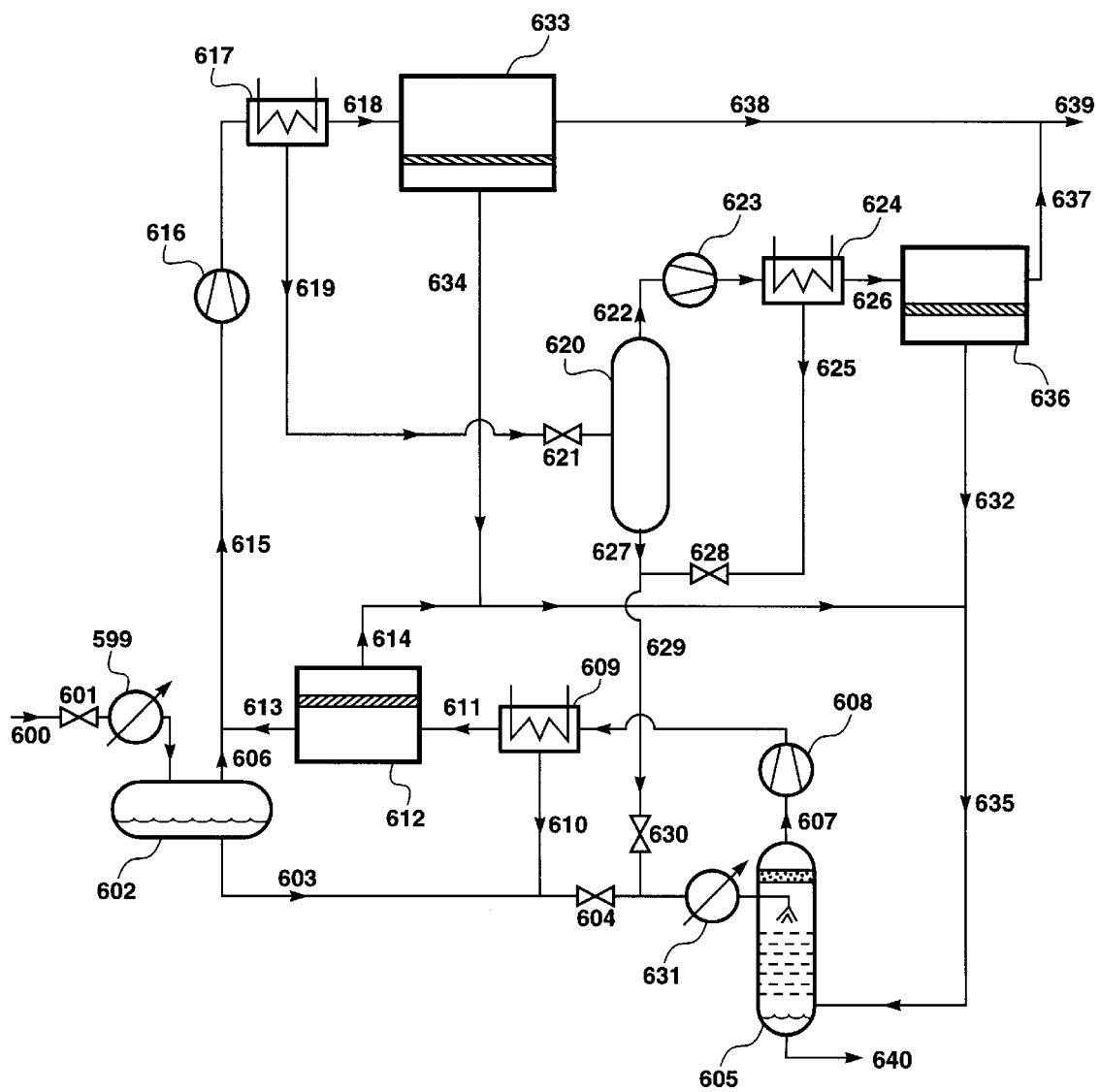
FIG. 6 is a schematic drawing of a preferred embodiment of the invention using three membrane separation units.

FIG. 6 shows an embodiment that incorporates processing steps that are generally found in standard prior art processing plants, but in which three membrane units are used to improve performance and/or reduce processing costs. The first membrane unit 612 treats the gas stream from the low-pressure separator, as in the embodiment of FIG. 4. The gas streams from both separators are then pooled and treated in the main membrane unit 633. The third membrane unit 636 treats the overhead from a small distillation unit used to stabilize the condensate.

In this embodiment, stream 600 is reduced in pressure by expansion valve 601, and passes through heater 599 into separator 602, where discrete liquid stream 603 and gas stream 606 are evolved. The pressure of liquid stream 603 is further reduced as it passes through expansion valve 604 into heater 631 and second absorber/stripper separator 605.

The evolved gases are withdrawn from each separator as high-pressure stream 606 and low-pressure stream 607. Stream 607 is repressurized by compressor 608 and cooled in after-cooler or condenser 609. Condensate stream 610 is returned through valve 604 to the low pressure separator. The non-condensed stream 611 is passed to membrane separation unit 612. Heavier hydrocarbon enriched low-pressure stream 614 is withdrawn from the permeate side. Residue stream 613 is mixed with the high-pressure gas stream 606 from the first separator to produce gas stream 615. Stream 615 is compressed to higher pressure by compressor 616 and chilled in condenser 617. As with the embodiment of FIG. 5, condensation in condenser 617 can be achieved by a combination of heat exchange with process streams, not shown for simplicity, and external cooling. Non-condensed stream 618 is passed to membrane separation unit 633 for treatment. The heavier hydrocarbon enriched, low-pressure permeate stream 634 is combined with the permeate stream 614 from the first membrane unit. The treated associated gas product stream is withdrawn as residue stream 638.

Unlike the embodiments discussed so far, the condensate stream 619 from condenser 617 is passed through valve 621 to a small distillation column 620. Such columns, typically containing between 5 and 10 trays, are commonly used to stabilize the condensate by removing more light hydrocarbons as an overhead stream, thereby producing a bottoms fraction, 627, enriched in $C_{4+}$ hydrocarbons. In the present embodiment, an additional membrane unit 636 is used to treat the light overhead stream, 622, from the distillation column. The stream passes through compressor 623 and condenser 624 and the non-condensed portion 626 is treated in the membrane unit to yield heavier hydrocarbon enriched permeate stream 632 and light hydrocarbon residue stream 637. The light stream can be combined with the gas from unit 633, as shown, to form a single associated gas product stream 639, suitable for pipelining or other use, or may be used or discharged separately. Permeate stream 632 is combined with the other permeate streams, 614 and 634, to form low-pressure stream 635 and returned as stripping gas to the bottom of absorber/stripper 605.

The pressure of the condensate stream 625 is lowered by valve 628 and this stream is combined with the bottom stream 627 from the distillation unit, to form stream 629 which is in turn combined, through valve 630, with stream 603 and returned to the second phase separator. Crude oil product is withdrawn from this phase separator as stream 640.

FIG. 6 shows condensate stream 625 and distillation column bottom stream 627 being returned as stream 629 to the lower-pressure phase separator through valve 604. Depending on the specific compositions of these streams, it may be preferred to adjust their pressure, vaporize them and mix with the membrane permeate stream for return in the stripping gas line 635, as is done with the condensate streams 514 and 519 in FIG. 5.

As with the embodiments of FIGS. 3 and 4, embodiments having three or more, instead of two, phase separation steps are preferred when the feed is at high pressure. In this case, streams 500 and 600 may represent the liquid stream from the upstream separator, which may be of any type, although most simply of the same type as separators 503 and 602, but operated at higher pressure. Alternatively or additionally, one or more separators could be positioned downstream of separators 506 or 605 to further treat streams 525 or 640.

Also as with the embodiments of FIGS. 3 and 4, the various preferred limitations, including but not limited to, operating pressure of the lowest pressure phase separator, vapor pressure of the product oil and effectiveness of the membrane in removing $C_{4+}$ hydrocarbons, discussed above in general, also apply to specific embodiments such as those of FIGS. 5 and 6.

For simplicity, the condensers in FIGS. 3–6 are identified by a single box from which the condensate liquid and remaining gas are shown emerging as discrete streams. It will be appreciated that, in practice, the condenser will often comprise a chiller, which produces a gas/liquid mixture, and a phase separator, in which the phases are separated and from which they are withdrawn as discrete streams. The same comment applies to all other condensers shown in the figures herein.

Those of skill in the art will appreciate that many other specific process arrangements, particularly with regard to placement of the membrane unit or units in the process scheme, are possible within the scope of the invention. For example, different arrangements that may be appropriate in some associated gas plants may be found in co-owned and copending Ser. No. 08/789,374, entitled "Natural Gas Liquids (NGL) Stabilization Process", which is incorporated herein by reference in its entirety.

The invention includes apparatus for separating oil/gas mixtures according to the diverse process possibilities, such as using the combinations and connections of separators, condensers, compressors, membrane units and so on shown in FIGS. 3–11 and 13–16. For example, in FIG. 3, the apparatus comprises a first phase separator vessel 303 and a second phase separator vessel 307. Fluid for treatment can enter the apparatus through line 300 and can be reduced in pressure by optional valve 301, if necessary, and warmed in heater 302. The separators are connected by line 309, so that the liquid phase from the first separator can be passed into the second separator. The line includes valve 304, enabling the second separator to be operated at lower pressure than the first, motionless mixer 305 and heater 306. Outlet 323 enables crude oil product to be withdrawn from the second phase separator. Compressor 313 is connected on its inlet side to the outlet line 312 from the second phase separator and on its outlet side to condenser 314. Line 315 enables condensate from condenser 314 to be returned to the second phase separator. Membrane unit 317 is connected on its feed side through line 316 to condenser 314, so that the non-condensed gas may be treated in the membrane unit. Line 319 provides for optional mixing of the gas from the membrane unit with the gas from the first phase separator. Line 318 provides for return of permeate gas to phase separation vessel 307. The combined gas streams from the phase separator and the membrane unit may optionally be passed through additional treatment means 321 to yield associated gas product stream 322. Such further treatment means can include additional membrane units, as illustrated by unit 633 in FIG. 6, or can involve only prior art equipment, such as compression/condensation units, distillation units and the like. If preferred, each gas stream may be individually subjected to further treatment in such types of equipment.

Those of skill in the art will appreciate that the apparatus used to carry out the separation may, of course, include other ancillary components, such as additional pumps, blowers, valves, heaters or coolers as desired.

When the membrane separation step uses a membrane that is organic-selective, that is, is selective for the $C_{4+}$ hydrocarbon components over methane, the residue and permeate streams from the membrane unit may be significantly colder than the membrane feed stream. This phenomenon, which is believed to arise because of Joule-Thomson cooling as the organic vapor expands across the membrane to the permeate side, is likely to occur if the membrane has a reasonably good selectivity for the $C_{4+}$ hydrocarbons over methane, such as about 5 or more, these components have a combined reasonably high concentration in the feed to the membrane unit, such as about 5%, 10% or more, and their removal from the membrane feed into the permeate is reasonably high, such as about 50%, 80%, 90% or more. The phenomenon is discussed in more detail in co-owned and copending Ser. No. 08/788,629, entitled "Membrane Expansion Process for Organic Component Recovery From Gases", which is incorporated herein by reference in its entirety.

Since the conditions mentioned above frequently obtain during removal of associated gas from oil according to the teachings herein, the membrane residue and permeate streams may typically be 5°0 C., 10° C. or more colder than the feed to the membrane unit, and it may be both convenient and beneficial to use one or both cold streams from the membrane separation step to provide or supplement cooling for the condensation step. For example, in FIG. 3 one or both of streams 319 and 318 could be used for heat exchange in condenser 314 before being passed to their next destinations, as could streams 416 and 417 in FIG. 4, or streams 524 and 523 in FIG. 5, and so on.

The invention is now illustrated by the following examples, which are intended to further clarify understanding of the invention, but are not intended to limit the scope or underlying principles in any way.

EXAMPLES

Example 1

A set of calculations was performed to compare the compositions of the product gas and liquid fractions from a phase separator assuming:

(a) no additional treatment of the gas stream from the separator was performed;

(b) the gas stream was treated by condensation under pressure;

(c) the gas stream was treated by a combination of condensation under pressure and membrane separation;

(d) the gas was treated as in (c), but using a larger membrane area;

(e) the gas stream was treated by a combination of condensation under pressure and membrane separation, and the heavy hydrocarbon-enriched stream from the membrane separation step was returned and equilibrated with the stream entering the phase separator; and (f) the gas stream was treated as in (e), but the return stream from the membrane unit was equilibrated with the stream entering the phase separator in five partitioning stages.

Only treatment options (e) and (f) are in accordance with the invention.

In each case the calculation was performed using Chem-Cad III software (Chemstations Inc., Houston, Tex.) to model the separation. In all cases, the feed stream was assumed to be 100 lbmol/h of composition:

| Methane | 2 mol % |
|---|---|
| Ethane | 4 |
| Propane | 6 |
| n-Butane | 8 |
| n-Pentane | 10 |
| n-Hexane | 20 |
| n-Decane | 50 | and the phase separation was assumed to be carried out at 35° C. and 20 psia.

(a) No additional treatment. (Not in accordance with the invention) The compositions and flow rates of the two-phase feed mixture, the gas phase from the separator and the liquid phase from the separator were calculated to be as shown in Tables 1 and 2.

In this case, the gas phase is produced at a rate of 473 lb/h, of which only 16.9 mol % is methane, and 29.2 mol % is $C_{4+}$ hydrocarbons.

TABLE 1

|  | Feed | Gas phase | Liquid phase |
| --- | --- | --- | --- |
| Flow (lbmol/h) | 100 | 11.2 | 88.8 |
| Temp (°C.) | 50 | 35 | 35 |
| Pressure (psia) | 20 | 20 | 20 |
| Component (mol %) |  |  |  |
| Methane | 2 | 16.9 | 0.1 |
| Ethane | 4 | 27.5 | 1.0 |
| Propane | 6 | 26.3 | 3.4 |
| n-Butane | 8 | 16.5 | 6.9 |
| n-Pentane | 10 | 7.4 | 10.3 |
| n-Hexane | 20 | 5.1 | 21.9 |
| n-Decane | 50 | 0.2 | 56.3 |

TABLE 2

|  | Feed | Gas phase | Liquid phase |
| --- | --- | --- | --- |
| Flow (lb/h) | 10,441 | 473 | 9,968 |
| Component flow (lb/h) |  |  |  |
| Methane | 32.1 | 30.5 | 1.64 |
| Ethane | 120 | 92.7 | 27.6 |
| Propane | 265 | 130 | 135 |
| n-Butane | 465 | 108 | 357 |
| n-Pentane | 721 | 60.2 | 661 |
| n-Hexane | 1,724 | 49.4 | 1,674 |
| n-Decane | 7,114 | 2.9 | 7,111 |

(b) Treatment by condensation under pressure alone. (Not in accordance with the invention) In this case, the gas stream from the phase separator was assumed to be compressed to 150 psia and cooled back to 35° C. The resulting condensate was assumed to be added back to the separator and the condenser off-gas formed the product associated gas. The compositions and flow rates of the two-phase feed mixture, the non-condensate gas phase and the liquid phase from the separator were calculated to be as shown in Tables 3 and 4.

TABLE 3

|  | Feed | Gas product | Liquid phase |
| --- | --- | --- | --- |
| Flow (lbmol/h) | 100 | 9.0 | 91 |
| Temp (°C.) | 50 | 35 | 35 |
| Pressure (psia) | 20 | 150 | 20 |
| Component (mol %) |  |  |  |
| Methane | 2 | 21.1 | 0.1 |
| Ethane | 4 | 34.3 | 1.0 |
| Propane | 6 | 29.5 | 3.7 |
| n-Butane | 8 | 11.9 | 7.6 |
| n-Pentane | 10 | 2.6 | 10.7 |
| n-Hexane | 20 | 0.6 | 21.9 |
| n-Decane | 50 | — | 55.0 |

— less than 0.001

TABLE 4

|  | Feed | Gas phase | Liquid phase |
| --- | --- | --- | --- |
| Flow (lb/h) | 10,441 | 326 | 10,115 |
| Component flow (lb/h) |  |  |  |
| Methane | 32.1 | 30.6 | 1.44 |
| Ethane | 120 | 93.3 | 27.0 |
| Propane | 265 | 118 | 147 |
| n-Butane | 465 | 62.4 | 403 |
| n-Pentane | 721 | 17.1 | 704 |
| n-Hexane | 1,724 | 5.0 | 1,719 |
| n-Decane | 7,114 | 0.006 | 7114 |

As can be seen by comparing Tables 2 and 4, the weight of the gas fraction is reduced from 473 lb/h to 326 lb/h by the condensation treatment, and by comparing Tables 1 and 3, the gas composition is reduced from 29.2 mol % $C_{4+}$ hydrocarbons to 15.1 mol % $C_{4+}$ hydrocarbons. The methane content of the gas is increased from 16.9 mol % to 21.1 mol %.

Figure 12:
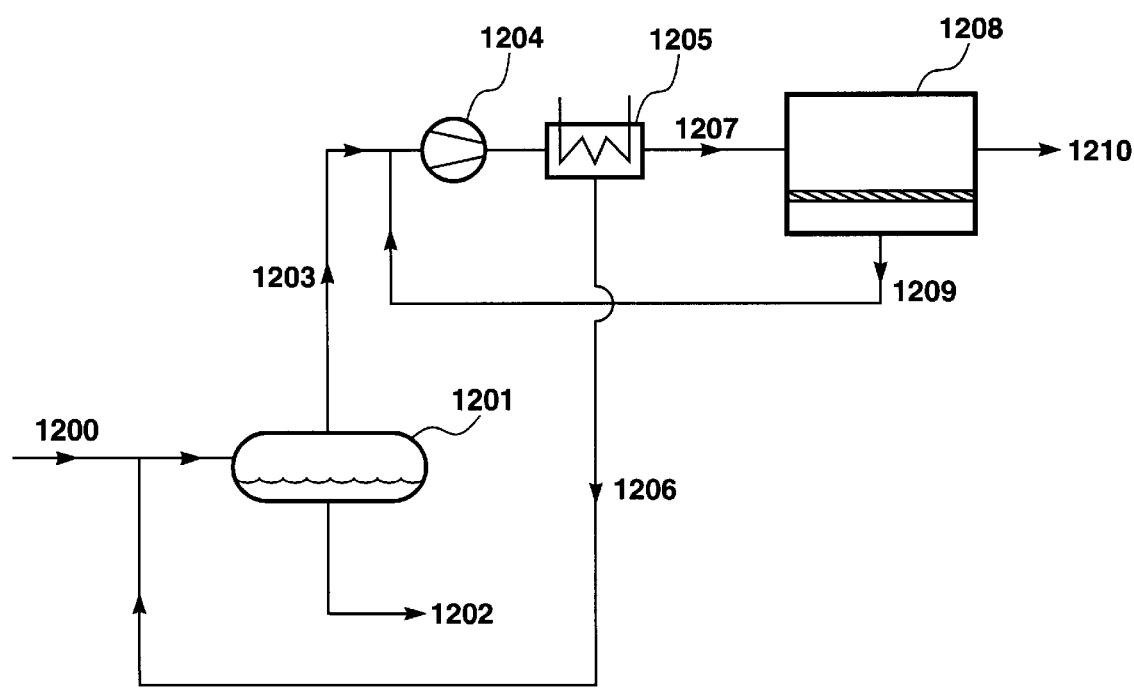
FIG. 12 is a schematic drawing of a process not in accordance with the invention in which the heavier-hydrocarbon-enriched stream from the membrane unit is not returned to the phase separation step.

(c) Treatment by condensation under pressure and membrane separation. (Not in accordance with the invention) This case is assumed to be as shown in FIG. 12, and is not in accordance with the invention. Referring to that figure, feed stream, 1200, enters phase separator 1201. The liquid oil phase is withdrawn as stream 1202. The gas phase, 1203, from the separator is compressed to 150 psia in compressor 1204, and cooled back to 35° C. in condenser 1205. The condensate stream, 1206, from the condenser is added back to the separator. The condenser off-gas, stream 1207, is passed to membrane unit 1208, which was assumed to contain a membrane selective for the heavier hydrocarbons over methane and have the following permeation properties:

| Gas: | Pressure normalized flux ($\times 10^{-6}$ cm$^3$(STP)/cm$^2 \cdot$ s $\cdot$ cmHg) |
| --- | --- |
| Methane | 160 |
| Ethane | 320 |
| Propane | 640 |
| n-Butane | 1,200 |
| n-Pentane | 1,600 |
| n-Hexane | 2,400 |
| n-Decane | 3,200 |

The gas is separated into residue stream 1210, which is the light associated gas product, and permeate stream 1209, enriched in the heavier $C_{4+}$ hydrocarbons, which is returned to the compressor inlet. The compositions and flow rates of the streams were calculated to be as shown in Tables 5 and 6.

TABLE 5

| Stream | 1200 | 1203 | 1206 | 1207 | 1209 | 1210 | 1202 |
| --- | --- | --- | --- | --- | --- | --- | --- |
| Flow (lbmol/h) | 100 | 19.8 | 12.7 | 39.2 | 32.1 | 7.1 | 92.9 |
| Temp. (°C.) | 50 | 35 | 35 | 35 | 24 | 24 | 35 |
| Pressure (psia) | 20 | 20 | 150 | 150 | 20 | 150 | 20 |
| Component (mol %): |  |  |  |  |  |  |  |
| Methane | 2 | 10.2 | 0.6 | 9.7 | 5.8 | 27.5 | 0.07 |
| Ethane | 4 | 21.9 | 8.7 | 29.7 | 26.2 | 45.9 | 0.83 |
| Propane | 6 | 34.7 | 40.0 | 46.5 | 51.2 | 25.0 | 4.5 |
| n-Butane | 8 | 20.3 | 30.6 | 11.9 | 14.2 | 1.5 | 8.5 |
| n-Pentane | 10 | 7.8 | 12.0 | 1.9 | 2.3 | 0.1 | 10.7 |
| n-Hexane | 20 | 5.0 | 7.8 | 0.37 | 0.45 | — | 21.5 |
| n-Decane | 50 | 0.2 | 0.3 | — | — | — | 53.8 |

— less than 0.001%

TABLE 6

| Stream | 1200 | 1203 | 1206 | 1207 | 1209 | 1210 | 1202 |
|---|---|---|---|---|---|---|---|
| Flow (lb/h) | 10,441 | 903 | 690 | 1,550 | 1,338 | 213 | 10,227 |
| Component flow (lb/h): | | | | | | | |
| Methane | 32.1 | 32.3 | 1.3 | 60.9 | 29.8 | 31.1 | 1.03 |
| Ethane | 120 | 131 | 33.4 | 350 | 253 | 97.3 | 23.1 |
| Propane | 265 | 303 | 225 | 803 | 726 | 77.9 | 186 |
| n-Butane | 465 | 234 | 228 | 271 | 265 | 6.1 | 459 |
| n-Pentane | 721 | 112 | 111 | 52.8 | 52.2 | 0.5 | 721 |
| n-Hexane | 1,724 | 86 | 86 | 12.4 | 12.3 | 0.03 | 1,724 |
| n-Decane | 7,114 | 4.9 | 4.9 | 0.02 | 0.02 | — | 7,114 |

— less than 0.001%
Calculated membrane area required: 29 m²
Calculated compressor horsepower required: 63 hp.

As can be seen by comparing Tables 4 and 6, the weight of the gas fraction is further reduced from 326 lb/h, using condensation treatment alone, to 213 lb/h using the combination of condensation and membrane separation treatment. The gas composition is reduced from 15.1 mol % $C_{4+}$ hydrocarbons (Table 3) to only 1.6 mol % $C_{4+}$ hydrocarbons (Table 5). Likewise, the weight of the oil fraction is increased from 10,115 lb/h (Table 4) to 10,227 lb/h (Table 6).

(d) Treatment by condensation under pressure and membrane separation. (Not in accordance with the invention) The calculations of section (c) above were repeated, using the same assumptions as in (c), except that a larger membrane area of 75 m² was used. The results of the calculations are shown in Tables 7 and 8. Comparing Tables 5 and 6 with Tables 7 and 8, the weight of the gas fraction is further reduced from 213 lb/h to 185 lb/h, and the methane content of the gas is raised from 27.5 mol % to 30 mol %. The weight of oil is increased from 10,227 lb/h to 10,253 lb/h. However, the membrane area required to achieve this better result is 75 m² compared with 29 m² for section (c), and the compressor horsepower requirement is 132 hp, rather than 63 hp.

TABLE 7

| Stream | 1200 | 1203 | 1206 | 1207 | 1209 | 1210 | 1202 |
|---|---|---|---|---|---|---|---|
| Flow (lbmo/lh) | 100 | 24.2 | 17.7 | 91.9 | 85.4 | 6.5 | 93.5 |
| Temp. (°C.) | 50 | 35 | 35 | 35 | 24 | 24 | 35 |
| Pressure (psia) | 20 | 20 | 150 | 150 | 20 | 150 | 20 |
| Component (mol %): | | | | | | | |
| Methane | 2 | 8.3 | 0.4 | 6.2 | 4.4 | 30.0 | 0.06 |
| Ethane | 4 | 19.6 | 8.1 | 27.6 | 25.8 | 50.8 | 0.74 |
| Propane | 6 | 38.8 | 46.0 | 53.4 | 56.0 | 18.7 | 5.1 |
| n-Butane | 8 | 20.3 | 27.7 | 10.8 | 11.6 | 0.40 | 8.5 |
| n-Pentane | 10 | 7.8 | 10.6 | 1.7 | 1.8 | 0.02 | 10.7 |
| n-Hexane | 20 | 5.0 | 6.9 | 0.33 | 0.35 | — | 21.4 |
| n-Decane | 50 | 0.2 | 0.2 | — | — | — | 53.5 |

— less than 0.001%

TABLE 8

| Stream | 1200 | 1203 | 1206 | 1207 | 1209 | 1210 | 1202 |
|---|---|---|---|---|---|---|---|
| Flow (lb/h) | 10,441 | 1,122 | 934 | 3,732 | 3,546 | 185 | 10,253 |
| Component flow (lb/h): | | | | | | | |
| Methane | 32.1 | 32.4 | 1.2 | 91.6 | 60.4 | 31.2 | 0.85 |
| Ethane | 120 | 143 | 43.3 | 763 | 664 | 99.1 | 20.8 |
| Propane | 265 | 414 | 359 | 2,162 | 2,98 | 53.6 | 209 |
| n-Butane | 465 | 286 | 285 | 577 | 576 | 1.5 | 463 |

TABLE 8-continued

| Stream | 1200 | 1203 | 1206 | 1207 | 1209 | 1210 | 1202 |
|---|---|---|---|---|---|---|---|
| n-Pentane | 721 | 136 | 135 | 112 | 112 | 0.08 | 721 |
| n-Hexane | 1,724 | 105 | 105 | 26.0 | 26.0 | 0.002 | 1,724 |
| n-Decane | 7,114 | 5.9 | 5.9 | 0.03 | 0.03 | — | 7,114 |

— less than 0.001%

(e) Treatment by condensation/membrane separation, with heavy hydrocarbon-enriched stream from the membrane separation step equilibrated with feed stream. (In accordance with the invention) This case is assumed to be as shown in FIG. 3. The calculation was performed in relation to the second phase separator, 307. Thus the feed stream for the calculation was stream 309, which enters phase separator 307. The liquid oil phase is withdrawn as stream 323. The gas phase, 312, from the separator is compressed to 150 psia in compressor 313, and cooled back to 35° C. in condenser 314. The condensate stream, 315, from the condenser is added back to the separator through in-line mixer 305. The condenser off-gas, stream 316, is passed to membrane unit 317, which was assumed to contain a membrane selective for the heavier hydrocarbons over methane and have the same permeability properties as in case (c). The gas is separated into residue stream 319 and permeate stream 318, which is enriched in the $C_{4+}$ hydrocarbons. Unlike cases (c) and (d), the heavier-hydrocarbon enriched stream is returned through mixer 305 and equilibrated with the feed. The compositions and flow rates of the streams were calculated to be as shown in Tables 9 and 10.

In this case, the process produces 189 lb/h of gas with a methane content of 30 mol %, and 10,249 lb/h of oil. These results are essentially the same as case (d). However, in this case, the membrane area used was only 29 m², as in case (c). The horsepower requirement was 86 hp. Thus, the process of the invention can achieve the same result as case (d), but with a much lower membrane area, slightly less than 40% of that of case (d). Or, viewed another way, the process of the invention, constrained to a small membrane area and modest compressor capacity, produces about 20 lb/h more oil and less gas than the process of case (c).

Compared with case (b), treatment by condensation alone, as is frequently performed now, the process of the invention produces 135 lb/h less gas and more oil, operating at the same pressure and temperature conditions of condensation. The gas fraction from treatment by condensation alone contains about 85 lb/h of $C_{4+}$ hydrocarbons, compared with only about 5 lb/h for the gas fraction produced by the process of the invention.

Although the increase in oil produced is only 1 or 2%, such incremental improvements are important to the industry, especially if, as in this case, the increased yield can be achieved at relatively small increase in energy consumption and operating costs.

TABLE 9

| Stream | 309 | 312 | 315 | 316 | 318 | 319 | 323 |
|---|---|---|---|---|---|---|---|
| Flow (lbmol/h) | 100 | 70.3 | 33.3 | 37.0 | 30.5 | 6.5 | 93.4 |
| Temp. (°C.) | 50 | 35 | 35 | 35 | 24 | 24 | 35 |
| Pressure (psia) | 20 | 20 | 150 | 150 | 20 | 150 | 20 |
| Component (mol %): | | | | | | | |
| Methane | 2 | 6.1 | 0.69 | 10.9 | 6.8 | 30.0 | 0.04 |
| Ethane | 4 | 22.5 | 9.9 | 33.8 | 30.6 | 49.0 | 0.85 |
| Propane | 6 | 38.3 | 35.2 | 41.1 | 45.7 | 19.7 | 5.0 |

TABLE 9-continued

| Stream | 309 | 312 | 315 | 316 | 318 | 319 | 323 |
|---|---|---|---|---|---|---|---|
| n-Butane | 8 | 20.2 | 29.8 | 11.5 | 13.8 | 1.2 | 8.5 |
| n-Pentane | 10 | 7.7 | 14.0 | 2.1 | 2.6 | 0.1 | 10.7 |
| n-Hexane | 20 | 5.0 | 10.1 | 0.47 | 0.6 | 0.006 | 21.4 |
| n-Decane | 50 | 0.17 | 0.36 | — | — | — | 53.5 |

— less than 0.001%

TABLE 10

| Stream | 309 | 312 | 315 | 316 | 318 | 319 | 323 |
|---|---|---|---|---|---|---|---|
| Flow (lb/h) | 10,441 | 3,270 | 1,838 | 1,433 | 1,243 | 189 | 10,249 |
| Component flow (lb/h): | | | | | | | |
| Methane | 32.1 | 68.3 | 3.7 | 64.6 | 33.2 | 31.4 | 0.62 |
| Ethane | 120 | 475 | 98.6 | 377 | 280 | 96.1 | 23.8 |
| Propane | 265 | 1,187 | 516 | 671 | 615 | 56.7 | 207 |
| n-Butane | 465 | 825 | 577 | 248 | 244 | 4.7 | 460 |
| n-Pentane | 721 | 393 | 337 | 56.7 | 56.0 | 0.46 | 721 |
| n-Hexane | 4,724 | 304 | 289 | 14.9 | 14.8 | 0.03 | 1,723 |
| n-Decane | 7,114 | 17.2 | 17.2 | 0.02 | 0.02 | — | 7,114 |

— less than 0.001%
Membrane area required: 29 m$^2$
Horsepower requirement: 64 hp.

(f) Treatment by condensation/membrane separation, with heavy hydrocarbon-enriched stream from the membrane separation step equilibrated in multiple partitioning stages with feed stream. (In accordance with the invention) This case is assumed to be as shown in FIG. 4. The calculation was performed in relation to the second phase separator, 406. Thus the feed stream for the calculation was stream 408, which enters phase separator 406. The liquid oil phase is withdrawn as stream 421. The gas phase, 410, from the separator is compressed to 150 psia in compressor 411, and cooled back to 35° C. in condenser 412. The condensate stream, 413, from the condenser is added back to the separator through valve 404. The condenser off-gas, stream 414, is passed to membrane unit 415, which was assumed to contain a membrane selective for the heavier hydrocarbons over methane and have the same permeability properties as in case (c). The gas is separated into residue stream 417 and permeate stream 416, which is enriched in the $C_{4+}$ hydrocarbons. The heavier-hydrocarbon enriched stream is returned and equilibrated with the feed, this time by using it as a stripping gas in phase separator 406, which was assumed to provide five partitioning stages. The compositions and flow rates of the streams were calculated to be as shown in Tables 11 and 12.

In this case, the process produces 192 lb/h of gas with a methane content of 30 mol %, and 10,249 lb/h of oil. These results are essentially the same as case (e) above. These results are achieved, however, with a membrane area of 15 m$^2$, compared with 29 m$^2$ for case (e), and a horsepower requirement of 49 hp, compared with 86 hp for case (e).

TABLE 11

| Stream | 408 | 410 | 413 | 414 | 416 | 417 | 421 |
|---|---|---|---|---|---|---|---|
| Flow (lbmol/h) | 100 | 51.1 | 29.2 | 22.0 | 15.4 | 6.6 | 93.4 |
| Temp. (°C.) | 50 | 50 | 35 | 35 | 26 | 26 | 35 |
| Pressure (psia) | 20 | 20 | 150 | 150 | 20 | 150 | 20 |
| Component (mol %): | | | | | | | |
| Methane | 2 | 6.9 | 0.91 | 14.9 | 8.4 | 30.0 | 0.03 |

TABLE 11-continued

| Stream | 408 | 410 | 413 | 414 | 416 | 417 | 421 |
|---|---|---|---|---|---|---|---|
| Ethane | 4 | 22.5 | 10.9 | 37.8 | 33.4 | 48.1 | 0.89 |
| Propane | 6 | 31.0 | 28.8 | 34.0 | 40.1 | 19.6 | 5.1 |
| n-Butane | 8 | 19.3 | 26.3 | 10.1 | 13.6 | 2.0 | 8.4 |
| n-Pentane | 10 | 10.9 | 17.3 | 2.5 | 3.5 | 1.9 | 10.7 |
| n-Hexane | 20 | 8.9 | 15.0 | 0.68 | 0.96 | 0.26 | 21.4 |
| n-Decane | 50 | 0.45 | 0.78 | — | 0.001 | — | 53.5 |

— less than 0.001%

TABLE 12

| Stream | 408 | 410 | 413 | 414 | 416 | 417 | 421 |
|---|---|---|---|---|---|---|---|
| Flow (lb/h) | 10,441 | 2,503 | 1,689 | 814 | 621 | 193 | 10,249 |
| Component flow (lb/h): | | | | | | | |
| Methane | 32.1 | 56.8 | 4.3 | 52.6 | 20.9 | 31.6 | 0.47 |
| Ethane | 120 | 346 | 95.7 | 250 | 155 | 95.2 | 25.2 |
| Propane | 265 | 700 | 370 | 329 | 273 | 56.9 | 208 |
| n-Butane | 465 | 575 | 445 | 129 | 122 | 7.5 | 458 |
| n-Pentane | 721 | 403 | 364 | 39.9 | 38.7 | 1.3 | 720 |
| n-Hexane | 1,724 | 390 | 377 | 12.9 | 12.8 | 0.15 | 1,723 |
| n-Decane | 7,114 | 32.7 | 32.7 | 0.02 | 0.02 | — | 7,114 |

— less than 0.001%
Membrane area required: 15 m$^2$
Horsepower requirement: 49 hp.

Example 2
(Not in accordance with the invention)

A set of calculations was performed according to the assumptions as in case (b) of Example 1, that is, the gas phase from the phase separator was assumed to have the same raw composition as in Example 1, and to be treated by condensation under pressure alone. All calculations assumed that the gas was compressed to 150 psia, but the temperature to which the gas was assumed to be chilled was varied. As before, the calculations were done with ChemCad III software. The results are summarized in Table 13. The column entitled "Fractional improvement in recovery" expresses the reduction in gas production compared with the "no condensation" case.

TABLE 13

| Condensation temperature (°C.) | Oil production (lb/h) | Gas production (lb/h) | Fractional improvement in recovery (%) | Methane content of gas (mol %) |
|---|---|---|---|---|
| No condensation | 9,968 | 473 | — | 17 |
| 35 (Example 1 (b)) | 10,115 | 326 | 31 | 21 |
| 25 | 10,153 | 287 | 39 | 23 |
| 15 | 10,190 | 250 | 47 | 25 |
| 5 | 10,224 | 215 | 55 | 28 |
| 35 (Example 1 (e)) | 10,249 | 189 | 60 | 31 |

Cooling to 35° C. can usually be achieved by air cooling. Lower temperatures must be reached by increasing levels of refrigeration, which are both costly and inconvenient, especially for remote and off-shore fields. Comparing this example with the process of the invention, Example 1, case (e), it can be seen that even refrigeration to 5° C. does not achieve as good results as the process of the invention, in which cooling to only 35° C. is used.

Example 3

A set of calculations was performed to evaluate the performance of the process of the invention as a function of the membrane area that is used. The assumptions were as in Example 1, case (e), that is condensation at 150 psia and 35° C., followed by membrane separation and return of the heavy hydrocarbon-enriched stream to be brought into equilibrium with the feed stream. The calculations were carried out using ChemCad III and assuming a fixed set of membrane areas to perform the separation. The results are summarized in Table 14. The column entitled "Fractional improvement in recovery" expresses the reduction in gas production compared with the "no membrane, no condensation" case.

TABLE 14

| Membrane area (m²) | Compressor capacity (hp) | Gas production (lb/h) | Fractional improvement in recovery (%) | Methane content in gas (mol %) | $C_{4+}$ hydrocarbon content in gas (mol %) |
|---|---|---|---|---|---|
| 0 | 0 | 473 | — | 17 | 29 |
| 20 | 63 | 202 | 57 | 29 | 8.7 |
| 40 | 118 | 179 | 62 | 31 | 2.9 |
| 60 | 179 | 169 | 64 | 32 | 1.5 |
| 100 | 307 | 158 | 66 | 34 | 0.6 |
| 500 | 1,590 | 135 | 71 | 37 | 0.01 |

It can be seen that the heavier hydrocarbon content of the gas can be reduced to very low levels. However, this is achieved at the expense of much greater horsepower and membrane area. The balance between performance and costs can be made to fit any specific set of circumstances.

Example 4 (Not in accordance with the invention)

Examples 1–3 are based on the oil being produced from the phase separator at a temperature of 35° C. and a pressure of 20 psia. If such an oil is to be stored at an average temperature of 20° C., the vapor pressure at that temperature will be about 14 psia. Thus, this oil is stable at atmospheric pressure at that temperature.

To obtain an oil that is stable at a higher storage temperature would require the phase separator to be operated at higher temperature and/or lower pressure. A set of calculations was performed to estimate the loss of hydrocarbon as gas that would occur under different phase separator conditions, assuming no treatment of the gas from the separator. The calculations were carried out using ChemCad III, and otherwise the same assumptions as in Example 1, case (a). Table 15 summarizes the results obtained assuming the phase separator temperature is 35° C., but the pressure is varied. Table 16 summarizes the results obtained assuming the phase separator pressure is 20 psia, but the temperature is varied.

As can be seen, attempting to stabilize the oil at a lower pressure or higher temperature results in increased and significant loss of $C_{4+}$ hydrocarbons in the gas.

TABLE 15

| Pressure (psia) | Oil produced (lb/h) | Gas produced (lb/h) | Gas as fraction of feed (wt %) | $C_{4+}$ hydrocarbon content of gas (mol %) |
|---|---|---|---|---|
| 20 | 9,968 | 473 | 4.5 | 29 |
| 15 | 9,794 | 647 | 6.2 | 36 |
| 10 | 9,490 | 950 | 9.1 | 46 |

TABLE 16

| Temperature (°C.) | Oil produced (lb/h) | Gas produced (lb/h) | Gas as fraction of feed (wt %) | $C_{4+}$ hydrocarbon content of gas (mol %) |
|---|---|---|---|---|
| 35 | 9,968 | 473 | 4.5 | 29 |
| 45 | 9,796 | 644 | 6.2 | 37 |
| 55 | 9,578 | 863 | 8.3 | 44 |

Example 5

A calculation was performed to evaluate the performance of the process of the invention if the phase separator is operated at 45° C. instead of 35° C. Otherwise, all the assumptions were as in Example 1, case (e). As before, the calculations were carried out using ChemCad III. The calculated compositions and flow rates of the streams were as shown in Tables 17 and 18.

TABLE 17

| Stream | 309 | 312 | 315 | 316 | 318 | 319 | 323 |
|---|---|---|---|---|---|---|---|
| Flow (lbmol/h) | 100 | 1,281 | 1,177 | 104 | 97.0 | 6.6 | 92.2 |
| Temp. (°C.) | 50 | 45 | 35 | 35 | 23 | 23 | 45 |
| Pressure (psia) | 20 | 20 | 150 | 150 | 20 | 150 | 20 |
| Component (mol %): | | | | | | | |
| Methane | 2 | 0.85 | 0.39 | 6.0 | 4.4 | 30.0 | 0.06 |
| Ethane | 4 | 10.6 | 8.9 | 30.2 | 28.6 | 53.9 | 0.35 |
| Propane | 6 | 44.5 | 44.0 | 51.1 | 53.5 | 15.8 | 4.8 |
| n-Butane | 8 | 25.7 | 27.0 | 10.5 | 11.2 | 0.3 | 8.3 |
| n-Pentane | 10 | 10.7 | 11.4 | 1.8 | 1.9 | 0.01 | 10.7 |
| n-Hexane | 20 | 7.4 | 8.0 | 0.38 | 0.40 | 0.004 | 21.6 |
| n-Decane | 50 | 0.32 | 0.35 | — | — | — | 54.2 |

— less than 0.001%

TABLE 18

| Stream | 309 | 312 | 315 | 316 | 318 | 319 | 323 |
|---|---|---|---|---|---|---|---|
| Flow (lb/h) | 10,441 | 67,064 | 62,886 | 4,177 | 3,990 | 187 | 10,194 |
| Component flow (lb/h): | | | | | | | |
| Methane | 32.1 | 175 | 74.4 | 101 | 68.6 | 31.9 | 0.08 |
| Ethane | 120 | 4,087 | 3,146 | 941 | 834 | 108 | 9.7 |
| Propane | 265 | 25,148 | 22,815 | 2,333 | 2,287 | 46.3 | 195 |
| n-Butane | 465 | 19,97 | 18,473 | 634 | 633 | 1.2 | 447 |
| n-Pentane | 721 | 9,848 | 9,714 | 134 | 134 | 0.07 | 713 |

TABLE 18-continued

| Stream | 309 | 312 | 315 | 316 | 318 | 319 | 323 |
|---|---|---|---|---|---|---|---|
| n-Hexane | 1,724 | 8,118 | 8,085 | 33.8 | 33.8 | 0.002 | 1,716 |
| n-Decane | 7,114 | 579 | 579 | 0.05 | 0.05 | — | 7,114 |

— less than 0.001%
Membrane area required: 85 m$^2$
Horsepower requirement: 1,185 hp As can be seen, the process of the invention can produce an oil with a vapor pressure of 20 psia at 45° C. When stored at 20° C., such an oil would have a vapor pressure of about 10 psia.

The gas fractions produced by the process of the invention according to this example, and from Example 4, data for 45° C., are compared in Table 19.

TABLE 19

| Treatment of gas from separator | Oil produced (lb/h) | Gas produced (lb/h) | Gas as fraction of feed (wt %) | Methane content of gas (mol %) | $C_{4+}$ hydrocarbon content of gas (mol %) |
|---|---|---|---|---|---|
| None | 9,796 | 644 | 6.2 | 17 | 29 |
| Process of the invention | 10,194 | 187 | 1.8 | 30 | 0.3 |

As can be seen, the process of the invention re covers over 98% of the feed as oil, compared with under 94% if the gas from the phase separator is not treated. Yet the vapor pressure of the oil is 20 psia at 45° C. in both cases.

Example 6

A set of calculations was performed to illustrate the performance of the process of the invention according to the embodiment shown in FIG. 5. The raw feed was assumed to have the composition shown in Table 20 and to be at 1,000 psia and to have a flow rate of 100,000 lb/h. Condensers 513 and 517 were both assumed to cool the gas to 35° C. Compressor 516 was assumed to recompress the gas to 1,000 psia. The first phase separator was assumed to be operated at 50° C. and 250 psia, the second at 50° C. and 30 psia. The lower pressure separator was assumed to contain three separation stages. Other assumptions were as in Example 1. As before, the calculations were done with ChemCad III software. The results are summarized in Table 20, where the stream notation is as in FIG. 5.

TABLE 20

| Stream | 500 | 508 | 507 | 512 | 520 | 509 | 521 | 523 | 524 | 525 |
|---|---|---|---|---|---|---|---|---|---|---|
| Flow (1,000 lb/h) | 100 | 11.9 | 88.1 | 4.9 | 2.1 | 18.1 | 23.1 | 9.7 | 13.4 | 8.7 |
| Temp. (°C.) | 50 | 50 | 50 | 35 | 35 | 48 | 35 | 19 | 19 | 35 |
| Pressure (psia) | 1,000 | 250 | 250 | 250 | 1,000 | 30 | 1,000 | 30 | 1,000 | 30 |
| Component (mol %): | | | | | | | | | | |
| Methane | 35 | 77.8 | 5.9 | 5.6 | 26.1 | 44.8 | 67.1 | 52.3 | 75.2 | 0.48 |
| Ethane | 10 | 16.4 | 5.7 | 10.3 | 26.0 | 28.1 | 22.8 | 28.5 | 19.8 | 1.6 |
| Propane | 3 | 29.6 | 3.0 | 8.9 | 15.0 | 11.2 | 6.5 | 11.4 | 3.8 | 2.3 |
| n-Butane | 2 | 9.6 | 2.7 | 10.0 | 10.1 | 4.9 | 2.1 | 4.4 | 0.79 | 3.0 |
| n-Pentane | 2 | 3.9 | 3.1 | 9.0 | 5.4 | 22.7 | 0.58 | 1.3 | 0.18 | 3.6 |
| n-Hexane | 18 | 13.8 | 29.3 | 53.4 | 17.4 | 8.4 | 0.88 | 2.1 | 0.20 | 33.3 |
| n-Decane | 30 | 0.60 | 50.3 | 2.7 | 0.01 | 0.3 | — | — | — | 55.8 |

— less than 0.001%
Membrane area required: 16 m$^2$
Horsepower requirement: 44 hp As can be seen from the table, the membrane residue (524) and permeate (523) streams are about 15° C. colder than the membrane feed stream. A calculation was performed to determine how much cooling could be supplied by the membrane if these streams were used to provide part of the cooling for condenser 517. The results are shown in Table 21.

TABLE 21

| | Stream | MMBtu/h | % cooling |
|---|---|---|---|
| Cooling required | Stream 515 | 0.7469 | — |
| | Stream 524 (residue) | 0.4635 | 62 |
| Cooling supplied | Stream 523 (permeate) | 0.2834 | 38 |
| | External cooling | 0 | 0 |

As can be seen, the membrane unit could be used to provide all of the cooling required for condenser 517. Under these conditions, we calculated in fact that the feed entering the membrane unit can be cooled to 20° C., rather than 35° C. as previously. This would reduce the membrane area and horsepower requirements of the process to achieve comparable results, or with the same membrane area and horsepower could increase the separation if needed.

Example 7

Examples 1–6 illustrate the invention as it relates to processes that use membranes selective for the heavier hydrocarbons over methane. A similar calculation was performed, but this time assuming that the membrane is selective for methane over the heavier hydrocarbons, with the following permeation properties:

| Gas: | Pressure normalized flux ($\times 10^{-6}$ cm$^3$(STP)/cm$^2 \cdot$ s $\cdot$ cmHg) |
|---|---|
| Methane | 20 |
| Ethane | 10 |
| Propane | 5 |
| n-Butane | 2 |
| n-Pentane | 1 |
| n-Hexane | 1 |
| n-Decane | 1. |

The process design was assumed to be as in FIG. 3, except that the residue stream from the membrane unit now forms the heavier hydrocarbon enriched stream that is returned to equilibrate with the feed, and the permeate stream forms the associated gas product stream. Other assumptions, including the feed stream composition and the conditions of condensation, were as in Example 1, case (e). As before, the calculations were carried out using ChemCad III. The calculated compositions and flow rates of the streams were as shown in Tables 22 and 23, where the stream notation is as in FIG. 3, except for the membrane residue and permeate streams.

TABLE 22

| Stream | 309 | 312 | 315 | 316 | Permeate product gas | Residue | 323 |
|---|---|---|---|---|---|---|---|
| Flow (lbmol/h) | 100 | 2,259 | 886 | 1,373 | 5.8 | 1,367 | 92.0 |
| Temp. (°C.) | 50 | 35 | 35 | 35 | 35 | 35 | 35 |
| Pressure (psia) | 20 | 20 | 150 | 150 | 20 | 150 | 20 |
| Component (mol %): | | | | | | | |
| Methane | 2 | 9.1 | 0.90 | 14.5 | 30.0 | 14.4 | 0.06 |
| Ethane | 4 | 26.0 | 10.4 | 36.0 | 43.5 | 36.0 | 0.98 |
| Propane | 6 | 32.7 | 29.6 | 34.8 | 22.8 | 34.8 | 4.3 |
| n-Butane | 8 | 19.1 | 30.6 | 11.8 | 3.3 | 11.8 | 8.0 |
| n-Pentane | 10 | 7.7 | 16.0 | 2.4 | 0.33 | 2.4 | 10.7 |
| n-Hexane | 20 | 5.0 | 12.1 | 0.54 | 0.08 | 0.55 | 21.6 |
| n-Decane | 50 | 0.17 | 0.44 | — | — | — | 54.4 |

— less than 0.001%

TABLE 23

| Stream | 309 | 312 | 315 | 316 | Permeate product gas | Residue | 323 |
|---|---|---|---|---|---|---|---|
| Flow (lb/h) | 10,441 | 101,758 | 50,218 | 51,539 | 176 | 51,364 | 10,166 |
| Component flow (lb/h): | | | | | | | |
| Methane | 32.1 | 3,314 | 128 | 3,186 | 28.0 | 3,158 | 0.92 |
| Ethane | 120 | 17,658 | 2,777 | 14,880 | 76.1 | 14,804 | 27.1 |
| Propane | 265 | 32,624 | 11,558 | 21,066 | 58.6 | 21,007 | 174 |
| n-Butane | 465 | 25,157 | 15,746 | 9,411 | 11.1 | 9,400 | 429 |
| n-Pentane | 721 | 12,587 | 10,241 | 2,346 | 1.4 | 2,345 | 708 |
| n-Hexane | 1,724 | 9,857 | 9,208 | 649 | 0.39 | 649 | 1,713 |
| n-Decane | 7,114 | 561 | 560 | 0.83 | — | 0.83 | 7,114 |

— less than 0.001%
Membrane area required: 305 m$^2$
Horsepower requirement: 2,086 hp.

Comparing this example with Example 1(e), it can be seen that comparable results can be obtained, but that the membrane area and horsepower requirements are much higher.

Example 8

A calculation was performed to show the performance of a basic embodiment of the invention using only phase separation and membrane separation, as in FIG. 1. It was assumed that the feed to the phase separator was as in Example 1, except that it contained 49 mol % decane and 1 mol % water. It was further assumed that no compressor was used between the gas outlet of the phase separator and the inlet to the membrane unit, and that, instead, a driving force for transmembrane permeation was provided by a vacuum pump in the permeate line that reduced the permeate side pressure to 2 psia. The outlet side of the vacuum pump was assumed to be at 20 psia, and the permeate stream exiting the pump was assumed to be recooled to 35° C. before being brought into equilibrating contact with the feed mixture. The membrane properties were assumed to be as in Example 1. The compositions of the various streams were calculated to be as shown in Table 24, where the stream notation is as in FIG. 1.

TABLE 24

| Stream | 3 | 4 | 5 | 6 | 7 |
|---|---|---|---|---|---|
| Flow (lb/h) | 10,317 | 9,764 | 9,576 | 188 | 10,128 |
| Temp. (°C.) | 50 | 35 | 35 | 35 | 35 |
| Pressure (psia) | 20 | 20 | 2 | 20 | 20 |
| Component (mol %): | | | | | |
| Methane | 2 | 3.1 | 2.1 | 30.0 | 0.02 |
| Ethane | 4 | 16.0 | 14.8 | 52.1 | 0.58 |
| Propane | 6 | 40.9 | 41.7 | 17.5 | 5.1 |
| n-Butane | 8 | 21.5 | 22.2 | 0.4 | 8.5 |
| n-Pentane | 10 | 8.3 | 8.6 | 0.02 | 10.7 |
| n-Hexane | 20 | 5.5 | 5.6 | — | 21.4 |
| n-Decane | 49 | 0.19 | 0.20 | — | 52.6 |
| Water | 1 | 4.5 | 4.7 | — | 1.1 |

— less than 0.001%
Calculated membrane area required: 900 m$^2$
Calculated compressor horsepower required: 200 hp As can be seen, this design can produce a light gas stream containing essentially no $C_{4+}$ hydrocarbon components and no water, and an oil stream containing only 0.6 mol % combined C., and $C_2$ components. However, the membrane area required to perform the separation was calculated to be 900 m$^2$, and the horsepower requirement of the vacuum pump was calculated to be 200 hp.

Example 9

Figure 13:
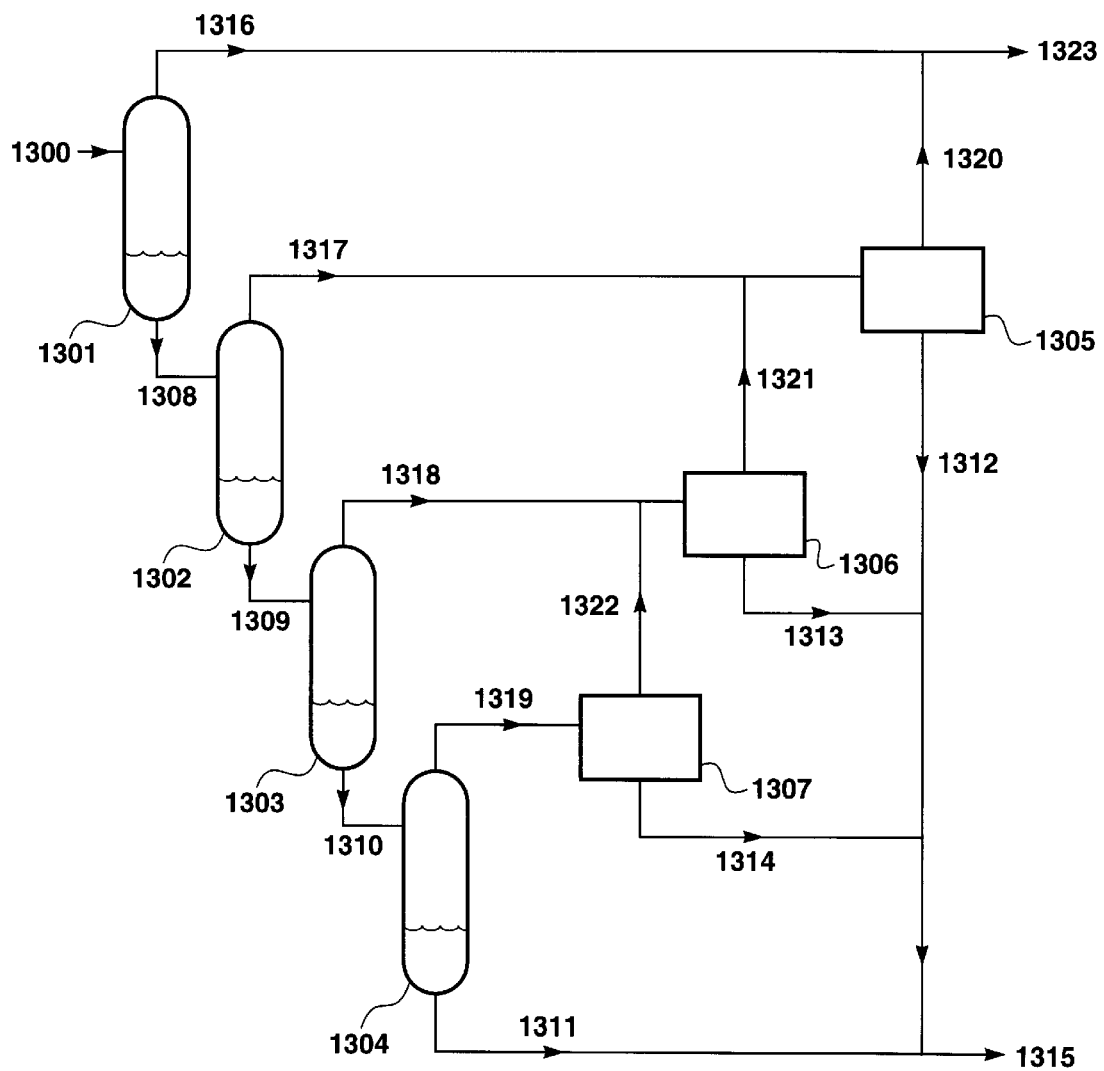
FIG. 13 is a schematic drawing of a process not in accordance with the invention using four phase separation stages and no membrane separation.

A set of calculations was performed to highlight the oil recovery aspects of the invention. In this case, it was assumed that the oil/gas mixture from the well is treated by progressively lowering its pressure in four phase separators to 1,020 psia, 315 psia, 70 psia and finally 17 psia. For the base case calculation, it was assumed that no membrane treatment was used, and that the arrangement is as shown in FIG. 13, where the raw fluid is stream 1300 and the four phase separators at progressively lower pressure are shown as units 1301, 1302, 1303 and 1304. These units each produce an oil stream, 1308, 1309, 1310 and 1311, respectively, and a gas stream, 1316, 1317,1318 and 1319, respectively.

The separated gas streams were all assumed to be recompressed to a pipeline pressure of 1,020 psia. The liquids condensed in the compressor aftercoolers were assumed to be separated and added to the crude oil produced by the lowest pressure separator. The recompressor/aftercooler and separator associated with gas stream 1317 are shown together for simplicity as box 1305. Likewise, the recompressor/aftercooler and separator for gas stream 1318 are shown as box 1306, for stream 1319 as box 1307. The condensed, separated oil from each of these units, streams 1312, 1313 and 1314 is added to stream 1311 to form crude oil product stream 1315. Recompressor 1307 produces uncondensed, recompressed gas stream 1322 at 70 psia, and this stream is further recompressed with stream 1318 in recompressor 1306. Likewise, recompressor 1306 produces uncondensed, recompressed gas stream 1321, which is passed to recompressor 1305, which produces gas stream 1320. Stream 1316 and 1320 are combined to form product stream 1323.

The raw fluid entering the first phase separator was assumed to be at a temperature of 50° C., and the compressor aftercoolers were assumed to cool the exiting gas streams to 40° C. in all cases.

Under these assumed conditions, the oil production and horsepower requirement for each compressor were calculated using the ChemCad III software as in the previous examples. The results are given as the top line in Tables 25–27.

In a real well, the total amount of oil produced by such a train is determined by the temperature, pressure and operating efficiency of the phase separators. To increase the oil production would, therefore, require the process operating conditions to be changed. Since these conditions are frequently predetermined by pipeline conditions or prevailing ambient temperatures, they are usually difficult or very difficult to change. However, by retrofitting a membrane unit or units, the process of the invention can be carried out, thereby increasing oil production without changing the basic operating conditions.

Figure 14:
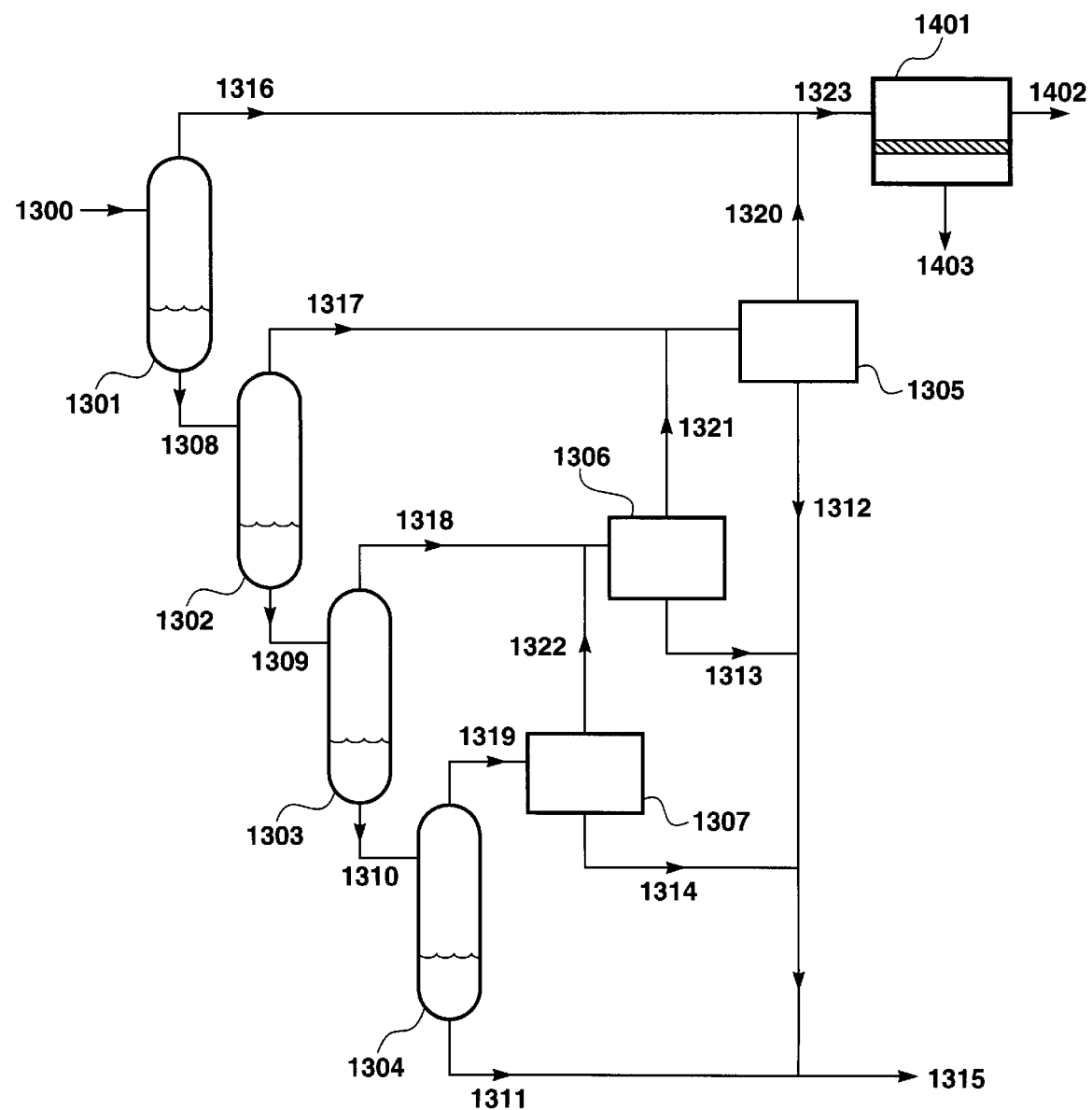
FIG. 14 a schematic drawing of an embodiment of the invention using four phase separation stages and in which the membrane unit treats the combined gas streams from the four stages.

To demonstrate this effect, it was first assumed that a membrane unit is fitted to treat the combined, recompressed gas streams, as shown in FIG. 14, where like elements are numbered as in FIG. 13. The membrane unit, 1401, is fed with the combined gas stream 1323, and produces an associated gas product stream, 1402, and a heavier-hydrocarbon-enriched permeate stream, 1403. It was further assumed that the heavier-hydrocarbon-enriched permeate from the membrane unit is returned: (a) to the phase separator operating at 315 psia; (b) to the phase separator operating at 70 psia; and (c) to the phase separator operating at 17 psia. For each case, the calculation was repeated with membrane areas of 150 m$^2$, 300 m$^2$, 450 m$^2$ and 600 m$^2$.

The results are summarized in Table 25 for case (a), Table 26 for case (b) and Table 27 for case (c).

TABLE 25

| Membrane area (m$^2$) | Compressor horsepower (hp) | | | | Oil produced (bbl/day) | Increased oil (bbl/day) | Increased hp (hp) | Ratio hp inc: oil inc |
|---|---|---|---|---|---|---|---|---|
| | 1305 | 1306 | 1307 | Total | | | | |
| 0 | 2,312 | 1,314 | 465 | 4,091 | 102,536 | 0 | 0 | — |
| 150 | 2,436 | 1,339 | 477 | 4,252 | 102,664 | 128 | 161 | 1.26 |

TABLE 25-continued

| Membrane area (m²) | Compressor horsepower (hp) | | | | Oil produced (bbl/day) | Increased oil (bbl/day) | Increased hp (hp) | Ratio hp inc: oil inc |
|---|---|---|---|---|---|---|---|---|
| | 1305 | 1306 | 1307 | Total | | | | |
| 300 | 2,559 | 1,363 | 489 | 4,411 | 102,786 | 250 | 320 | 1.28 |
| 450 | 2,683 | 1,386 | 500 | 4,569 | 102,902 | 366 | 478 | 1.31 |
| 600 | 2,808 | 1,408 | 511 | 4,727 | 103,013 | 477 | 636 | 1.33 |

TABLE 26

| Membrane area (m²) | Compressor horsepower (hp) | | | | Oil produced (bbl/day) | Increased oil (bbl/day) | Increased hp (hp) | Ratio hp inc: oil inc |
|---|---|---|---|---|---|---|---|---|
| | 1305 | 1306 | 1307 | Total | | | | |
| 0 | 2,312 | 1,314 | 465 | 4,091 | 102,536 | 0 | 0 | — |
| 150 | 2,488 | 1,591 | 475 | 4,554 | 102,732 | 196 | 463 | 2.36 |
| 300 | 2,666 | 1,870 | 486 | 5,022 | 102,927 | 391 | 931 | 2.38 |
| 450 | 2,843 | 2,152 | 497 | 5,492 | 103,118 | 582 | 1,401 | 2.41 |
| 600 | 3,022 | 2,452 | 507 | 5,981 | 103,307 | 771 | 1,890 | 2.45 |

TABLE 27

| Membrane area (m²) | Compressor horsepower (hp) | | | | Oil produced (bbl/day) | Increased oil (bbl/day) | Increased hp (hp) | Ratio hp inc: oil inc |
|---|---|---|---|---|---|---|---|---|
| | 1305 | 1306 | 1307 | Total | | | | |
| 0 | 2,312 | 1,314 | 465 | 4,091 | 102,536 | 0 | 0 | — |
| 150 | 2,478 | 1,315 | 810 | 4,603 | 102,769 | 233 | 512 | 2.20 |
| 300 | 2,646 | 1,968 | 1,129 | 5,743 | 103,037 | 501 | 1,652 | 3.30 |
| 450 | 2,814 | 2,275 | 1,438 | 6,527 | 103,302 | 766 | 2,436 | 3.18 |
| 600 | 2,982 | 2,577 | 1,737 | 7,926 | 103,559 | 1,023 | 3,205 | 3.13 |

As can be seen, the greatest improvement in oil production is achieved when the membrane permeate is returned to the lowest pressure phase separator. This creates the greatest pressure difference across the membrane, and hence the best membrane separation performance. However, the recompression requirements are also greatest in this case.

Example 10

Figure 15:
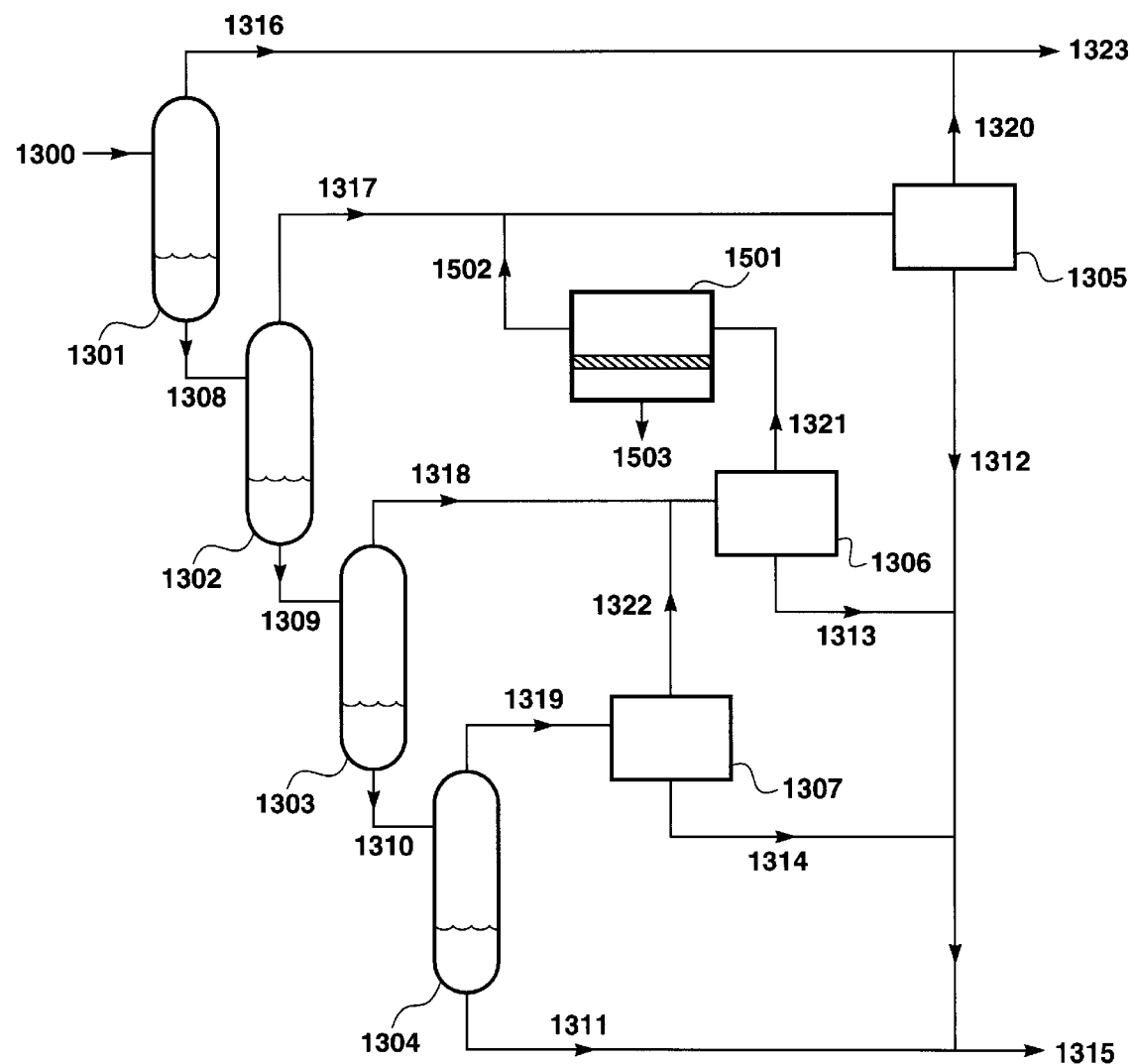
FIG. 15 is a schematic drawing of an embodiment of the invention using four phase separation stages and in which the membrane unit treats the gas stream from the penultimate phase separator.

A set of calculations was performed using similar assumptions to those of Example 9, the only difference being that a membrane unit was assumed to be fitted to treat the gas stream from the 70 psia phase separator after it has been recompressed to 315 psia, as shown in FIG. 15, where like elements are numbered as in FIG. 13. The membrane unit, 1501, is fed with gas stream 1321, and produces a residue stream, 1502, which is sent to recompressor 1305, and a heavier-hydrocarbon-enriched permeate stream, 1503. It was further assumed that the heavier-hydrocarbon-enriched permeate from the membrane unit is returned: (a) to the phase separator operating at 70 psia; and (b) to the phase separator operating at 17 psia. For each case, the calculation was repeated with membrane areas of 150 m², 300 m², 450 m² and 600 m².

The results are summarized in Table 28 for case (a) and Table 29 for case (b).

TABLE 28

| Membrane area (m²) | Compressor horsepower (hp) | | | | Oil produced (bbl/day) | Increased oil (bbl/day) | Increased hp (hp) | Ratio hp inc: oil inc |
|---|---|---|---|---|---|---|---|---|
| | 1305 | 1306 | 1307 | Total | | | | |
| 0 | 2,312 | 1,314 | 465 | 4,091 | 102,536 | 0 | 0 | — |
| 150 | 2,276 | 1,476 | 488 | 4,240 | 102,882 | 346 | 149 | 0.43 |
| 300 | 2,257 | 1,580 | 510 | 4,347 | 103,078 | 542 | 256 | 0.47 |
| 450 | 2,240 | 1,684 | 530 | 4,454 | 103,251 | 715 | 363 | 0.51 |
| 600 | 2,227 | 1,788 | 548 | 4,563 | 103,406 | 870 | 472 | 0.54 |

TABLE 29

| Membrane area (m²) | Compressor horsepower (hp) | | | | Oil produced (bbl/day) | Increased oil (bbl/day) | Increased hp (hp) | Ratio hp inc: oil inc |
|---|---|---|---|---|---|---|---|---|
| | 1305 | 1306 | 1307 | Total | | | | |
| 0 | 2,312 | 1,314 | 465 | 4,091 | 102,536 | 0 | 0 | — |
| 150 | 2,255 | 1,520 | 616 | 4,391 | 103,071 | 535 | 300 | 0.56 |
| 300 | 2,220 | 1,665 | 764 | 4,649 | 103,427 | 891 | 558 | 0.63 |
| 450 | 2,191 | 1,809 | 909 | 4,909 | 103,735 | 1,199 | 818 | 0.68 |
| 600 | 2,165 | 1,949 | 1,048 | 5,162 | 103,996 | 1,460 | 1,071 | 0.73 |

Again, a greater increase in oil production is achieved at greater transmembrane driving force, higher membrane area, and greater compressor capacity.

Example 11

Figure 16:
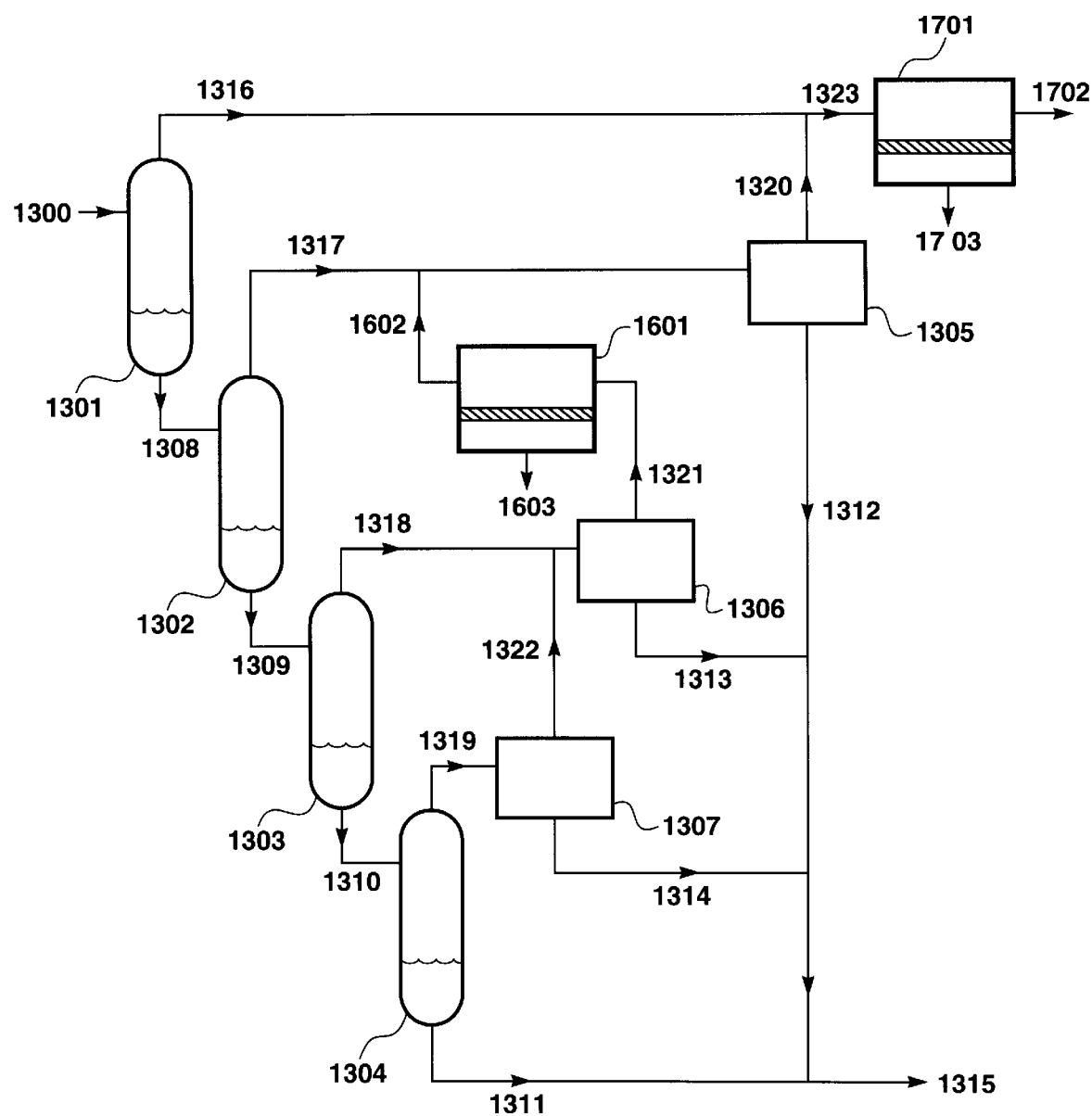
FIG. 16 a schematic drawing of an embodiment of the invention using four phase separation stages and in which two membrane units are used to treat both the gas stream from the penultimate phase separator and the combined gas streams from the four stages.

A set of calculations was performed using similar assumptions to those of Examples 9 and 10. In this case, it was assumed that two membrane units, 1601 and 1701, are fitted, so that the configuration is as shown in FIG. 16, where like elements are numbered as in FIG. 13. Membrane unit, 1601, produces a residue stream, 1602, which is sent to recompressor 1305, and a heavier-hydrocarbon-enriched permeate stream, 1603. Membrane unit, 1701, produces an associated gas product stream, 1702, and a heavier-hydrocarbon-enriched permeate stream, 1703. It was further assumed that stream 1603 is returned to the phase separator operating at 17 psia, and that stream 1703 is returned to the phase separator operating at 70 psia. For each case, the calculation was repeated with membrane areas of 150 m², 300 m², 450 m² and 600 m².

The results are summarized in Table 30.

TABLE 30

| Membrane area (m²) | Compressor horsepower (hp) | | | | Oil produced (bbl/day) | Increased oil (bbl/day) | Increased hp (hp) | Ratio hp inc: oil inc |
|---|---|---|---|---|---|---|---|---|
| | 1305 | 1306 | 1307 | Total | | | | |
| 0 | 2,312 | 1,314 | 465 | 4,091 | 102,536 | 0 | 0 | — |
| 150 | 2,430 | 1,803 | 632 | 4,865 | 103,199 | 663 | 774 | 1.17 |
| 300 | 2,398 | 1,946 | 768 | 5,112 | 103,510 | 974 | 1,021 | 1.05 |
| 450 | 2,368 | 2,086 | 909 | 5,363 | 103,788 | 1,252 | 1,272 | 1.02 |
| 600 | 2,341 | 2,224 | 1,047 | 5,612 | 104,032 | 1,496 | 1,521 | 1.02 |

We claim:

1. A process for treating a first fluid containing methane and other hydrocarbons, including $C_{4+}$ hydrocarbons, comprising the following steps:
   (a) subjecting said first fluid to phase separation by pressure reduction, in a series of phase separation sub-steps at progressively lower pressures, from a highest pressure phase separation sub-step to a lowest pressure phase separation sub-step, each sub-step producing an oil stream and a gas stream, wherein said oil stream from one sub-step is fed to the next sub-step;
   (b) subjecting at least one of said gas streams to condensation by compression and cooling, thereby removing a portion of said $C_{4+}$ hydrocarbons as a liquid condensate from said gas stream, and leaving a non-condensed stream;
   (c) subjecting said non-condensed stream to membrane separation, thereby producing a light stream enriched in methane compared with said non-condensed stream, and a heavy stream enriched in $C_{4+}$ hydrocarbons compared with said non-condensed stream;
   (d) returning said heavy stream to bring said heavy stream into equilibrating contact with at least a portion of said first fluid undergoing one of said phase separation sub-steps; and
   (e) withdrawing said oil stream from said lowest pressure phase separation sub-step as a crude oil product stream.

2. The process of claim 1, wherein said returning step brings said heavy stream into equilibrating contact with said oil stream that is fed to said lowest pressure phase separation sub-step.

3. The process of claim 1, wherein said condensation step is performed on said gas stream from said lowest pressure phase separation sub-step.

4. The process of claim 1, wherein said steps (b) and (c) are carried out on more than one of said gas streams.

5. The process of claim 1, wherein said condensation step (b) is carried out on all of said gas streams, thereby producing multiple non-condensed streams that are combined to form a single combined non-condensed stream for treatment in said membrane separation step (c).

6. The process of claim 1, wherein said series of phase separation sub-steps comprises at least two phase separation sub-steps.

7. The process of claim 1, said series of phase separation sub-steps comprises at least three phase separation sub-steps.

8. The process of claim 1, wherein said equilibrating contact is achieved in one theoretical partitioning stage.

9. The process of claim 1, wherein said equilibrating contact is achieved in multiple theoretical partitioning stages.

10. The process of claim 1, wherein said equilibrating contact is achieved by mixing said heavy stream with said portion of said first fluid prior to passing said portion into a phase separation vessel.

11. The process of claim 1, wherein said equilibrating contact is achieved by mixing said heavy stream with said portion of said first fluid in a motionless mixer.

12. The process of claim 1, wherein said equilibrating contact is achieved by mixing said heavy stream with said portion of said first fluid in an eductor.

13. The process of claim 1, wherein said equilibrating contact is achieved by running said heavy stream in countercurrent absorption/stripping contact against said portion of said first fluid.

14. The process of claim 1, wherein said membrane separation step is carried out using a membrane selective for said $C_{4+}$ hydrocarbons over methane.

15. The process of claim 1, wherein said membrane separation step is carried out using a membrane selective for methane over said $C_{4+}$ hydrocarbons.

16. The process of claim 1, further comprising returning said liquid condensate to said phase separation step.

17. The process of claim 1, further comprising subjecting said liquid condensate to a distillation step, thereby producing a bottoms fraction enriched in $C_{4+}$ hydrocarbon compared with said liquid condensate.

18. The process of claim 17, further comprising returning said bottoms fraction to said phase separation step.

19. The process of claim 1, wherein said crude oil product stream has a vapor pressure of no more than 20 psia at 20° C.

20. The process of claim 1, wherein said crude oil product stream has a vapor pressure of no more than 10 psia at 20° C.

21. The process of claim 1, wherein said returning step (d) establishes a new vapor/liquid equilibrium condition within said one of said phase separation sub-steps at a pressure and temperature that is different from an old vapor/liquid equilibrium condition that would exist at said pressure and temperature absent return of said heavy stream.

22. The process of claim 1, wherein said returning step (d) results in transfer of more methane and less $C_{4+}$ hydrocarbon by weight into said gas stream at a pressure and temperature than would occur at said pressure and temperature absent return of said heavy stream.

23. The process of claim 1, wherein said membrane separation step (c) removes at least about 10 vol % of the $C_{4+}$ hydrocarbons from the non-condensed stream into the heavy stream.

24. The process of claim 1, wherein said membrane separation step (c) removes at least about 50 vol % of the $C_{4+}$ hydrocarbons from the non-condensed stream into the heavy stream.

25. The process of claim 1, wherein said membrane separation step (c) removes at least about 90 vol % of the $C_{4+}$ hydrocarbons from the non-condensed stream into the heavy stream.

26. The process of claim 1, wherein said cooling is achieved at least in part by heat exchange against said light stream.

27. The process of claim 1, wherein said cooling is achieved at least in part by heat exchange against said heavy stream.

28. The process of claim 1, wherein said cooling is achieved at least in part by heat exchange against said light stream and said heavy stream.

29. A process for treating a hydrocarbon fluid to separate methane and ethane from $C_{4+}$ hydrocarbons, comprising the steps of:
(a) subjecting said fluid to a first phase separation step by pressure reduction to a first pressure, thereby producing a first crude oil stream and a first gas stream;
(b) subjecting said first crude oil stream to a second phase separation step by pressure reduction to a second pressure thereby producing a crude oil product stream and a second gas stream;
(c) compressing and cooling said second gas stream, thereby removing a portion of said $C_{4+}$ hydrocarbons as a liquid condensate from said second gas stream and leaving a non-condensed portion;
(d) subjecting said non-condensed portion to membrane separation, thereby producing a light associated gas stream enriched in methane compared with said non-condensed portion, and a heavy stream depleted in methane and enriched in $C_{4+}$ hydrocarbon compared with said non-condensed portion;
(e) returning said heavy stream to said second phase separation step.

30. The process of claim 29, wherein said second phase separation step is carried out at a pressure no greater than about 50 psia.

31. The process of claim 29, wherein said second phase separation step is carried out at a pressure no greater than about 30 psia.

32. The process of claim 29, wherein said second phase separation step is carried out at a pressure no greater than about 17 psia.

33. The process of claim 29, wherein said crude oil product stream has a vapor pressure of no more than 20 psia at 20° C.

34. The process of claim 29, wherein said crude oil product stream has a vapor pressure of no more than 10 psia at 20° C.

35. The process of claim 29, wherein said membrane separation step (d) removes at least about 10 vol % of the $C_{4+}$ hydrocarbons from the non-condensed stream into the heavy stream.

36. The process of claim 29, wherein said membrane separation step (d) removes at least about 50 vol % of the $C_{4+}$ hydrocarbons from the non-condensed stream into the heavy stream.

37. The process of claim 29, wherein said membrane separation step (d) removes at least about 90 vol % of the $C_{4+}$ hydrocarbons from the non-condensed stream into the heavy stream.

38. The process of claim 29, wherein said first gas stream and said light associated gas stream are combined to form an associated gas product stream, which is subjected to further treatment.

39. The process of claim 29, further comprising subjecting said fluid to an additional phase separation step carried out upstream of said first phase separation step (a), said additional phase separation step producing an intermediate crude oil stream that is subjected to said first phase separation step (a).

40. The process of claim 29, further comprising subjecting said crude oil product stream to an additional phase separation step.

41. A process for treating a hydrocarbon fluid to separate methane and ethane from $C_{4+}$ hydrocarbons, comprising the steps of:
(a) subjecting said fluid to a first phase separation step by pressure reduction to a first pressure, thereby producing a first crude oil stream and a first gas stream;
(b) subjecting said first crude oil stream to a second phase separation step by pressure reduction to a second pressure thereby producing a crude oil product stream and a second gas stream;
(c) compressing said second gas stream and combining it with said first gas stream to form an intermediate associated gas stream;

(d) cooling said intermediate associated gas stream, thereby removing a portion of said $C_{4+}$ hydrocarbons as a liquid condensate from said intermediate associated gas stream and leaving a non-condensed portion;

(e) subjecting said non-condensed portion to membrane separation, thereby producing a light associated gas stream enriched in methane compared with said non-condensed portion, and a heavy stream depleted in methane and enriched in $C_{4+}$ hydrocarbon compared with said non-condensed portion;

(f) returning said heavy stream to said second phase separation step.

42. The process of claim 41, wherein said second phase separation step is carried out at a pressure no greater than about 50 psia.

43. The process of claim 41, wherein said second phase separation step is carried out at a pressure no greater than about 30 psia.

44. The process of claim 41, wherein said second phase separation step is carried out at a pressure no greater than about 17 psia.

45. The process of claim 41, wherein said membrane separation step (e) removes at least about 10 vol % of the $C_{4+}$ hydrocarbons from the non-condensed stream into the heavy stream.

46. The process of claim 41, wherein said membrane separation step (e) removes at least about 50 vol % of the $C_{4+}$ hydrocarbons from the non-condensed stream into the heavy stream.

47. The process of claim 41, wherein said membrane separation step (e) removes at least about 90 vol % of the $C_{4+}$ hydrocarbons from the non-condensed stream into the heavy stream.

48. The process of claim 41, further comprising subjecting said fluid to an additional phase separation step carried out upstream of said first phase separation step (a), said additional phase separation step producing an intermediate crude oil stream that is subjected to said first phase separation step (a), and an additional associated gas stream, which is combined with said intermediate associated gas stream.

49. The process of claim 41, further comprising subjecting said crude oil product stream to an additional phase separation step, said additional phase separation step producing an additional associated gas stream, which is combined with said intermediate associated gas stream.

50. A process for treating a first fluid containing methane and other hydrocarbons, including $C_{4+}$ hydrocarbons, comprising the following steps:

(a) subjecting said first fluid to phase separation by pressure reduction, in a series of phase separation sub-steps at progressively lower pressures, from a highest pressure phase separation sub-step to a lowest pressure phase separation sub-step, each sub-step producing an oil stream and a gas stream, wherein said oil stream from one sub-step is fed to the next sub-step;

(b) subjecting at least one of said gas streams to membrane separation, thereby producing a light stream enriched in methane compared with said at least one gas stream, and a heavy stream enriched in $C_{4+}$ hydrocarbons compared with said at least one gas stream;

(c) returning said heavy stream to bring said heavy stream into equilibrating contact with at least a portion of said first fluid undergoing one of said phase separation sub-steps; and (d) withdrawing said oil stream from said lowest pressure phase separation sub-step as a crude oil product stream.

51. Apparatus for separating a fluid containing methane and other hydrocarbons, including $C_{4+}$ hydrocarbons, into an associated gas product and a crude oil product, comprising:

(a) a first phase separator means having a fluid inlet by which fluid for separation can enter and a gas outlet from which gas can be withdrawn;

(b) a second phase separator means having a connection to said first phase separator means such that liquid can flow out of said first phase separator means and into said second phase separator means, further having means for providing equilibrating contact between liquid passing therethrough and gas returned from the membrane separation unit of element (e), and further having an oil outlet from which said crude oil product can be withdrawn;

(c) a compressor connected to said second phase separator means such that gas can flow out of said second phase separator means and through said compressor;

(d) a condenser connected to an outlet from said compressor such that compressed gas exiting said compressor can be cooled and partially condensed in said condenser;

(e) a membrane separation unit, containing a membrane having a feed side and a permeate side and being selective for said $C_{4+}$ hydrocarbons over methane, and connected to said condenser such that non-condensed gas from said condenser can flow across said feed side, and connected to said second phase separator means such that gas from said permeate side can be returned to said second phase separator means, and having a residue gas outlet from which gas can be withdrawn.

* * * * *